United States Patent
Coin et al.

(10) Patent No.: US 6,590,644 B1
(45) Date of Patent: Jul. 8, 2003

(54) OPTICAL MODULE CALIBRATION SYSTEM

(75) Inventors: Bryan Coin, Campbell, CA (US); Michael J. Ransford, Millersville, MD (US); David A. Schwarten, Ellicott City, MD (US); Chao Jiang, Ellicott City, MD (US); Iqbal M. Dar, Marriottsville, MD (US); Andrei Csipkes, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/759,563

(22) Filed: Jan. 12, 2001

(51) Int. Cl.[7] .................................................. G01J 1/42
(52) U.S. Cl. ........................ 356/218; 356/73; 359/110; 37/20
(58) Field of Search ................................ 356/218, 213, 356/214, 215, 217, 219, 221, 222, 225, 226.73, 73.1; 359/109, 110, 111, 117, 189; 371/20, 25; 326/73 AT, 73 R, 73 PC

(56) References Cited

U.S. PATENT DOCUMENTS

| | | | | |
|---|---|---|---|---|
| 4,348,759 A | * | 9/1982 | Schnurmann | 371/20 |
| 4,397,021 A | * | 8/1983 | Loyd et al. | 371/20 |
| 4,760,330 A | * | 7/1988 | Lias, Jr. | 324/73 R |
| 4,894,829 A | * | 1/1990 | Monie et al. | 371/20.1 |
| 5,148,233 A | * | 9/1992 | Imamura et al. | 356/243 |
| 5,521,751 A | * | 5/1996 | Aida et al. | 359/110 |
| 5,548,399 A | * | 8/1996 | Takai et al. | 356/218 |
| 5,631,759 A | * | 5/1997 | Bogdan et al. | 359/189 |
| 5,666,059 A | * | 9/1997 | Heuermann et al. | 324/601 |
| 5,712,942 A | | 1/1998 | Jennings et al. | 385/134 |
| 6,097,201 A | | 8/2000 | Slocum | 324/760 |
| 6,363,507 B1 | * | 3/2002 | Truebenbach et al. | 714/734 |

* cited by examiner

Primary Examiner—Frank G. Font
Assistant Examiner—Sang H. Nguyen
(74) Attorney, Agent, or Firm—Michael R. Cammarata

(57) ABSTRACT

A system for calibrating a plurality of optical modules includes a plurality of optical signal sources and optical signal degradation elements optically communicating with input switches. The input switches supply optical test signals to optical modules (units under test) plugged into a common shelf. Calibration switches including variable optical attenuators may be used to adjust the input signal levels and alternately supply adjusted signals to an optical power meter and the units under test. A controller is used to control the adjustment and thereby provide defined, measured signal levels to the units under test. By reading data from the units under test and using these defined signal levels, the optical modules may be calibrated or diagnosed. Output optical switches are used in a similar fashion to calibrate or diagnose the outputs of the units under test. In addition to input/output power calibration, the invention may also perform wavelength calibrations.

20 Claims, 15 Drawing Sheets

OPTICAL MODULE CALIBRATION SYSTEM

BACKGROUND OF THE INVENTION

1. Field of Invention

The invention generally relates to testing and calibration of optical and electro-optical modules, generically referred to herein as "modules" or "optical modules." More specifically, the invention relates to systems, apparatuses and methods for performing parallel, asynchronous testing and calibration of optical and/or electro-optical modules.

2. Description of Related Art

Electronic manufacturers that produce large volumes of identical components have sought to improve widely-used serial testing techniques by employing parallel testing schemes. Such parallel test schemes subject a large number of identical electronic devices to the same test. The test cycle for such electronic components is relatively short and the testing of a plurality of such components is initiated simultaneously. In other words, there is known a synchronous, parallel testing scheme for testing electronic components.

Optical networking equipment manufacturing presents difficult challenges not faced by electronic equipment manufacturers. It is quite common for optical networking equipment manufacturers to specially build a set of optical networking equipment to order. Furthermore, the orders are often unpredictable and sporadic which means that the manufacturing must be highly adaptable and dynamic.

In other words, optical networking equipment manufacturing is a high mix environment in which a variety of different modules are made. The mix of equipment may change on a daily or even hourly basis. This is particularly true for WDM (wave division multiplexed) or DWDM (dense wave division multiplexing) equipment in which a large number of, for example, transmitters, receivers, and transceivers are built each of which may have a different construction and may be designed for a different channel wavelength. Thus, it is inefficient to dedicate a production line or testing station to a particular module or component.

The conventional method of manufacturing optical and electro-optical components and modules is essentially a serial process. For example, a component or module is partially assembled, then tested, then more fully assembled, then tested again, and so on in a sequential fashion. Such serial assembly and testing is inefficient and labor intensive.

Typically, test stations are used to test a component or module in the assembly line. Such test stations are designed to perform a specific test or set of tests in sequence. The test station and the test sequence is specific to the product or assembly line. As such, the typical test station is not flexible and leads to inefficient utilization of test equipment and labor resources. Furthermore, the high mix environment faced by optical networking equipment manufacturers makes using a parallel testing architecture inadequate since different tests needs to be performed on the high mix of components.

SUMMARY OF THE INVENTION

The invention may be characterized as an optical module calibration system for calibrating a plurality of optical modules, including: a plurality of optical test signal generators each capable of outputting an optical test signal; a plurality of input switches each optically communicating with the optical test signal generators and a corresponding one of the optical modules to be tested; a plurality of optical signal measuring instruments; a plurality of output switches each optically communicating with the optical signal measuring instruments and a corresponding one of the optical modules to be tested; and a controller operatively connected to the optical modules, the optical test signal generators, the input switches, the output switches, and the optical signal measuring instruments, the controller controlling the optical modules, the optical test signal generators, the input switches, the output switches, and the optical signal measuring instruments to calibrate the plurality of the optical modules.

Furthermore, at least some of the optical signal measuring instruments may be optical power meters each optically communicating with a corresponding one of the input switches and measuring an input optical power input to a corresponding one of the optical modules; the controller using input optical power measurements received from the optical power meters to send commands to the optical modules for calibrating the optical modules.

The controller may also receive data from the optical modules indicative of the respective optical module's reception of the optical test signal. This controller may also calibrate the optical modules according to the input optical power measurements received from the optical power meters and the data received from the optical modules.

In addition to calibration, the controller may also diagnose the optical modules based on the input optical power measurements received from the optical power meters and the data received from the optical modules.

Furthermore, the invention may use a plurality of variable optical attenuators each optically interposed between a corresponding one of the input switches and a corresponding one of the optical modules; each of the variable optical attenuators also optically communicating with a corresponding one of the optical power meters; the controller also operatively connected to the variable optical attenuators; and the controller also commanding the variable optical attenuators to adjust input optical power levels received by corresponding optical modules.

Still further, the calibration switches may each include a corresponding one of the variable optical attenuators and optically interposed between a corresponding one of the input switches and a corresponding one of the optical modules; each of the calibration switches having a signal output port optically communicating with a corresponding one of the optical modules and a calibration output port optically communicating with a corresponding one of the optical power meters; and the controller also operatively connected to the calibration switches.

The controller may also control the calibration switches to alternately supply the optical test signals to a corresponding one of the corresponding optical modules.and to a corresponding one of the optical power meters; receive input optical power measurements from the optical power meters indicative of the input optical power supplied to the optical modules; utilize the received input optical power measurements to control the variable optical attenuators to adjust the input optical powers of the optical test signals to a next desired power level when the calibration switches alternately supply the optical test signals to the optical power meters; and controller receive data from the optical modules indicative of the respective optical module's reception of the respective optical test signal.

Another capability of the invention is to tune each of the optical power meters and the optical test signal generators to a corresponding wavelength. This is particularly useful for optical modules having differing operating wavelengths.

The controller may also use the output optical power measurements received from the optical power meters to send commands to the optical modules for calibrating the optical modules.

Output calibration is another feature of the invention. To enable output calibration, the controller may receive data from the optical modules indicative of the respective optical module's output optical signal power. More specifically, the controller may calibrate the optical modules according to the output optical power measurements received from the optical power meters and the data received from the optical modules. Furthermore, an optical signal degrader may be used to degrade a corresponding optical test signal to a desired signal-to-noise ratio.

Wavelength tuning is also possible with the invention if at least some of the optical signal measuring instruments are wavelength meters each measuring an output wavelength output by a corresponding one of the optical modules. The controller may use output wavelength measurements received from the wavelength meters to send commands to the optical modules for calibrating the optical modules.

Moreover, the controller may control the optical test signal generators, the input switches, the output switches, and the optical signal measuring equipment to perform parallel asynchronous calibration of the optical modules.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Furthermore, the term "connection" and "operative connection" as used herein is a relative term and does not require a direct physical connection. For example, controller 70 may communicate with other elements by using a communication pathway over a fiber span, an Internet connection, or wireless communication pathway. Such alternative communication pathways may be convenient in view of the potentially physically distinct locations that may be provided for the various elements.

Figure 1:
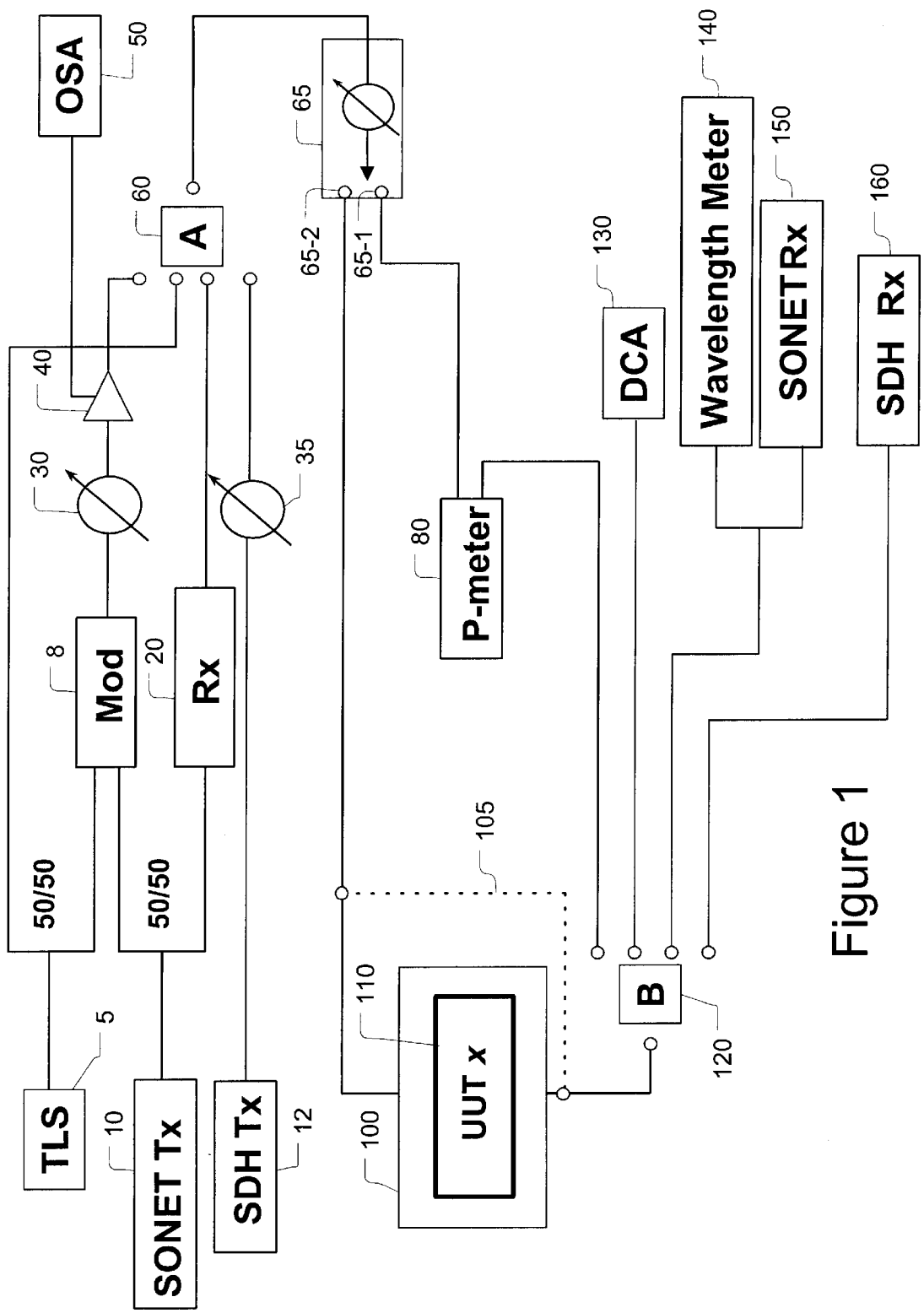
FIG. 1 is a block diagram illustrating a single port of a multi-port parallel asynchronous optical module testing system according to the invention.

FIG. 1 illustrates a segment of an overall system for subjecting a Unit Under Test (UUT) 110 to optical testing. A UUT 110 may be an optical or electro-optical communications device, component or system and is also called a "module" herein.

Figure 2:
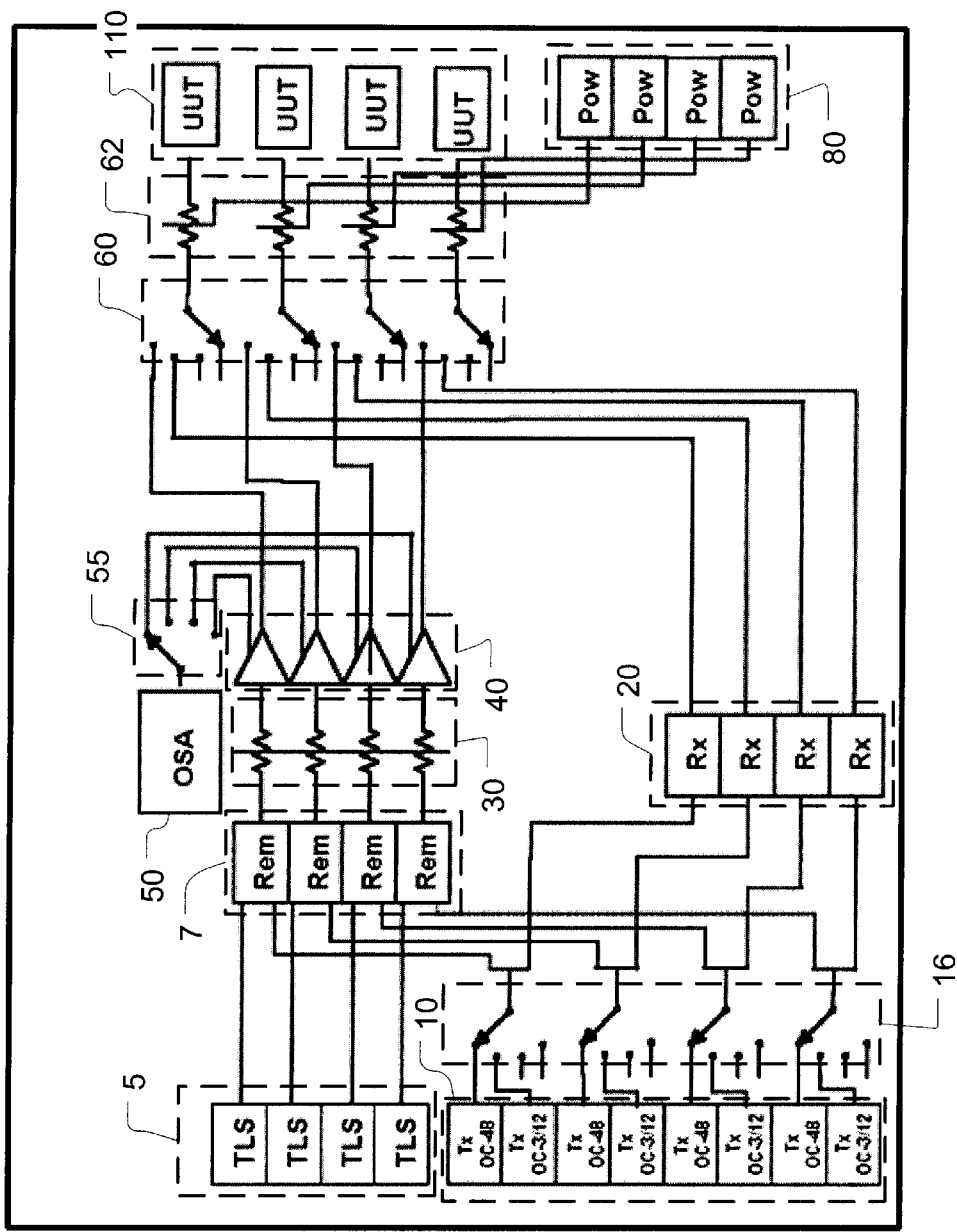
FIG. 2 is a block diagram showing an input section of a multi-port parallel asynchronous optical module testing system according to the invention.
Figure 3:
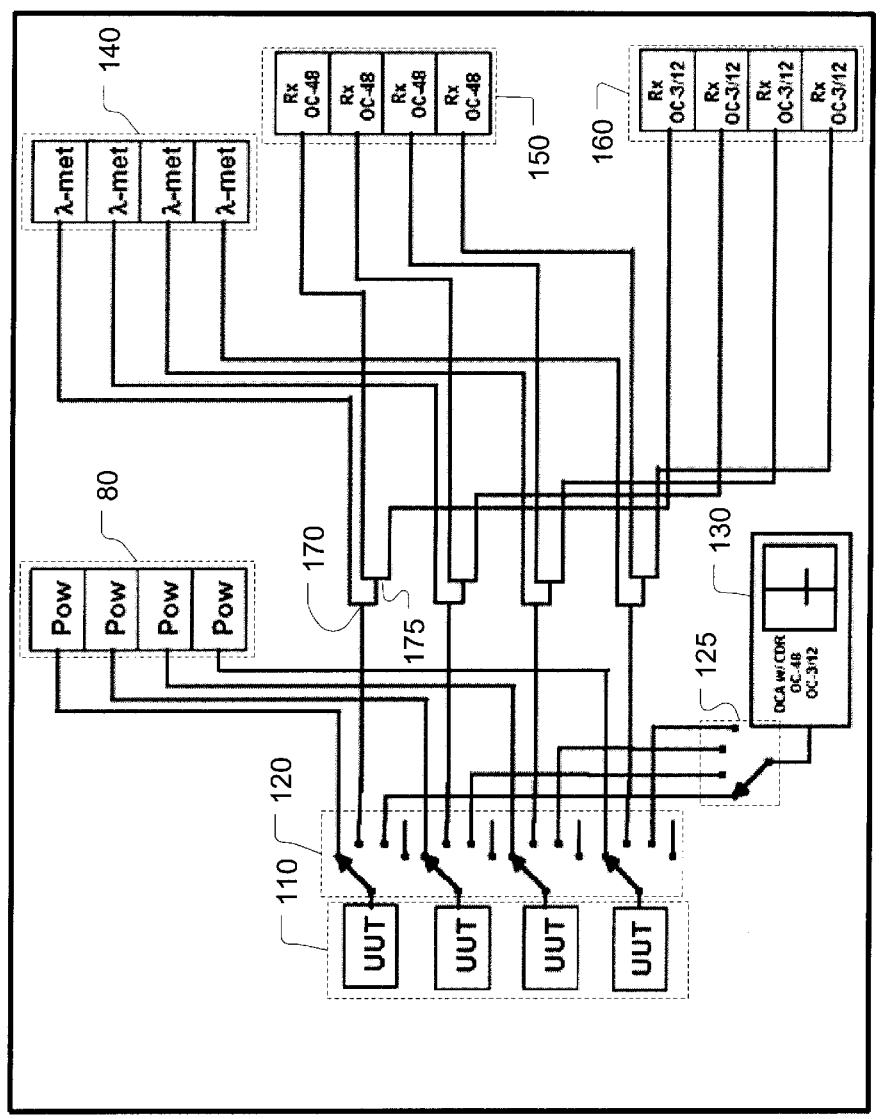
FIG. 3 is a block diagram showing an output section of a multi-port parallel asynchronous optical module testing system according to the invention.
Figure 4:
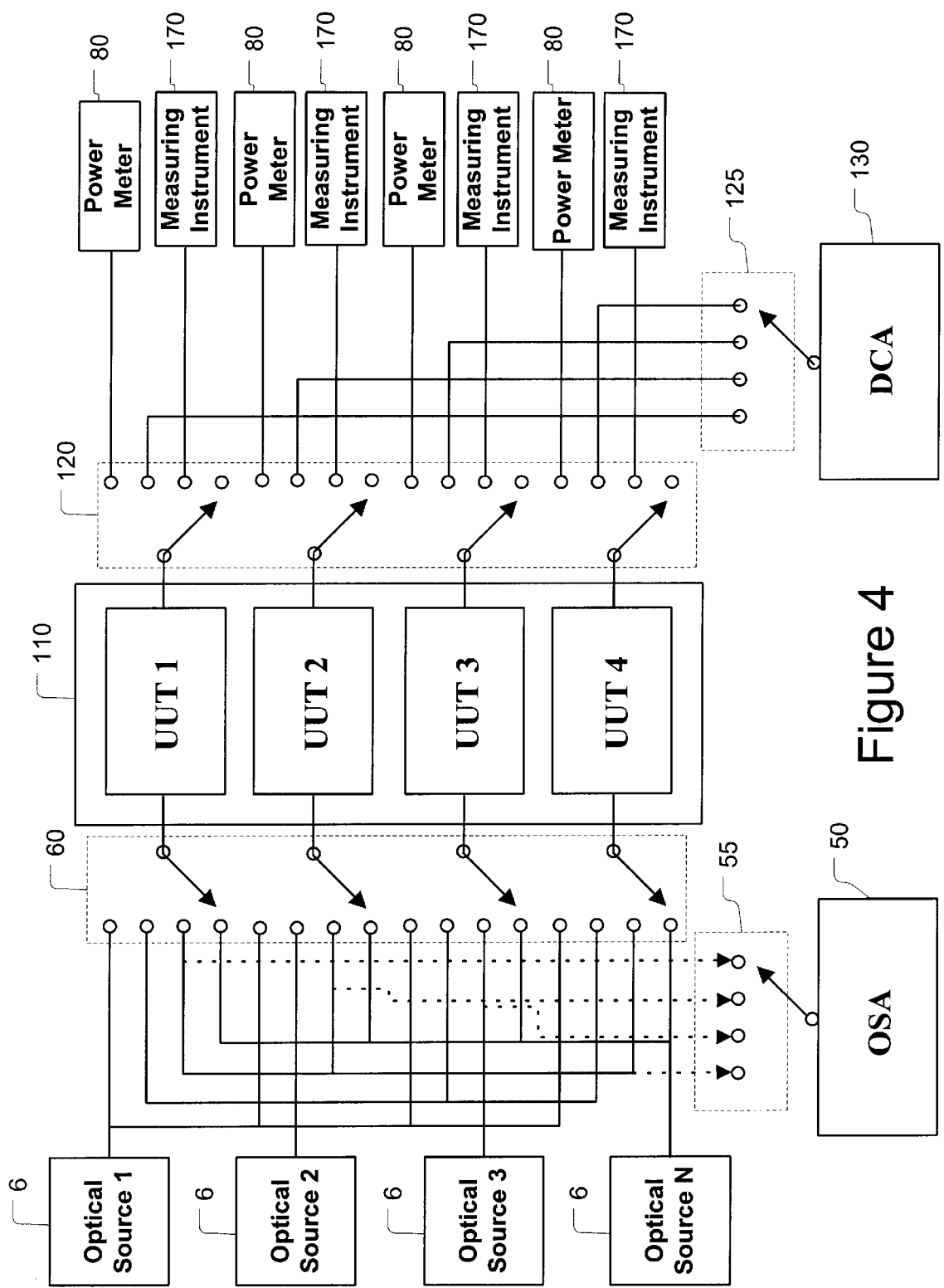
FIG. 4 is a block diagram of a switching architecture of a multi-port parallel asynchronous optical module testing system according to the invention.

The segment illustrated in FIG. 1 shows the input and output sides of the optical testing and calibration system as it relates to a single (number x out of a plurality of units) UUT 110. The connections shown in FIG. 1, as well as FIGS. 2–4, are optical connections that may be made with optical fiber.

Starting with the input side (top portion), FIG. 1 illustrates a variety of optical signal sources including a tunable laser source (TLS) 5, a synchronous optical network transmitter (SONET Tx) 10 and synchronous digital hierarchy transmitter (SDH Tx) 12. Each of these optical signal sources is a conventional device. The SONET Tx 10 and SONET Rx 150 (as well as the SDH Tx 12 and SDH Rx 160) are often packaged as test sets (e.g. Tektronix is a sample vendor that offers a product line of such test sets) capable of both transmitting an optical test signal, receiving an optical signal and testing the received optical signal. For example, SONET Tx/Rx 10/150 test set may be remotely configured to output a SONET compliant OC-48 optical signal at a particular wavelength to the invention for processing by the UUT 110 and then receive the processed signal for a variety of tests such as a bit error rate test (BERT).

Other types of tests that may be conducted by a SONET Tx/Rx 10/150 test set include LOS (loss of signal), testing, LOF (loss of frame) testing, and overhead byte (e.g. J0, J1, B1) monitoring all of which are conventional tests in and of themselves. Another type of test that may be performed depending upon the capabilities of the UUT 110 is a performance monitoring test in which the SONET Tx 10 injects errors into the optical test signal. If the UUT 110 is provided with the capability, then the UUT 110 may report the number of errors received. The UUT 110 may report the number of errors received which may then be used to monitor performance by comparing the number of errors received against the number of errors injected.

It is to be understood that SONET and SDH are merely examples of signaling formats and that other formats or standards may be used or the input test signal. It is to be further understood that OC-48 is just a sample of the various data rates and that higher or lower rates may be utilized to conduct testing depending upon the particular optical or electro-optical module that will be tested as the UUT 110.

TLS 5 outputs a continuous wave (CW) optical signal at a certain wavelength. As the name suggests, the tunable laser source 5 may adjust the center wavelength of the output CW signal. A TLS 5 is quite useful in the WDM (wave division multiplexing) environment because each channel of the WDM system utilizes a separate wavelength. Thus, each of the transmitters, receivers and transceiver modules of a DWDM system will expect an optical signal of a certain wavelength. To test and calibrate a mix of such optical modules (the UUT 110), the system advantageously utilizes a TLS 5 the wavelength of which may be commanded by a controller 70 as further described in the operational section below.

The output of TLS 5 may be split (e.g. a 50/50 split as shown in FIG. 1) into two signals one of which is fed to input switch (A) 60 and the other of which passes through a modulator (Mod) 8, a variable optical attenuator (VOA) 30 and an optical amplifier 40 before arriving at input switch 60. The VOA 30 and optical amplifier 40 are also conventional elements. Examples of the optical amp 40 include an erbium doped fiber amplifier (EDFA) and a Raman amplifier.

The modulator 8 is a conventional element that modulates the CW signal from TLS 5 according to a data signal (e.g. from an electrical sync data signal from SONET Tx 10). A variety of devices may serve as modulator 8 such as Mach-Zehnder type modulator driven by an electrical data signal.

The purpose of VOA 30 is to adjust the signal to noise ratio (S/N) and otherwise simulate real-world testing conditions that a typical transmitted optical signal is subjected to before reception. To make up for the signal strength lost in the VOA 30, the optical amplifier 40 may be utilized. The optical amp 40 also aids in the simulation of real-world conditions as optical signals routinely undergo amplification by such optical amps 40. As is known in the art VOAs and optical amps are also noisy elements and the invention utilizes this otherwise undesirable feature to advantage.

Although the arrangement of VOA 30 and optical amp 40 may be altered, the preferred arrangement is as shown because it more closely approximates real-world signal which involves signal degradation. VOA 30 and/or optical amp 40 are being used to degrade the optical signal and may be termed as an "optical signal degradation elements" or "optical signal degraders."

FIG. 1 also shows another optical signal degrader alternative to the combination of VOA 30 and optical amp 40. Namely, a VOA 35 may be used by itself to adjust the S/N ratio particularly when the optical signal strength is sufficient for the testing and calibration functions of the invention. Alternatively, an optical amp 40 may also be used without VOA 35 to introduce noise. As another alternative, other optical components or fiber may be used as optical signal degraders. Nevertheless, the combination of VOA 35 and optical amp 40 is generally preferred because it closely simulates real-world noise and may be controlled either manually or via controller 70 as further described below in the operation section to provide an optical test signal to UUT 110 having a desired S/N ratio.

To analyze the effect on the optical signal by VOA 30 and/or optical amplifier 40 and to otherwise measure the signal quality input to the UUT 110, an optical spectral analyzer (OSA) 50 may be connected to a tapped output of optical amp 40 as further shown in FIG. 1. More specifically, the OSA 50 may be used to calibrate the S/N ratio received by the UUT 110 by sending a S/N ratio measurement to controller 70 (see FIG. 5) which the controller 70 then uses to adjust the VOA 30 so that the S/N ratio is a desired value (e.g. meeting industry or company standards such that UUT 110 can successfully detect an optical signal with that S/N ratio).

FIG. 1 offers another alternative to supplying an optical signal to a UUT 110. Namely, a receiver (Rx) 20 may optically coupled to a transmitter such as SONET Tx 10. Receiver 20 is an O/E/O (optical/electrical/optical) type receiver that receives an optical signal, converts it to an electrical signal which is then used to drive optics (e.g. typically very short reach (VSR) or short reach (SR) but perhaps long reach (LR) or very long reach (VLR)) that outputs an optical signal.

Like the noise generation elements (e.g. VOA 30 and/or optical amp 40) discussed above, the receiver 20 is used to simulate real-world conditions. Specifically, it is quite common for a receiving element such as receiver 20 to be placed in an optical path upstream of a particular unit (here, the unit under test UUT 110). The inventive system seeks to test and calibrate such UUTs 110 with such a simulated real-world signal.

The various optical input signals are fed to optical switch 60 (input switch A) which is a conventional 4×1 optical switch. Of course, a different number of optical inputs may be used and the switch 60 size may be similarly adjusted. Although the switch 60 may be manually controlled, it is preferable for controller 70 to operate switch 60 as further explained below in the operation section.

The output of switch 60 is fed to a calibration element 65 which is preferably an optical switch paired with a VOA as shown in FIG. 1. An optical power meter (P-meter) 80 is connected to the calibration output 65-1 of calibration element 65 such that when element 65 switches to the calibration output, the optical signal is provided to the power meter 80. In this way, the power meter 80 may measure the optical power received by the UUT 110. Furthermore, the VOA within calibration element 65 may also be adjusted so that UUT 110 may receive signal having different, desired optical signal power levels for calibration as further described in the operation section below.

A test signal output 65-2 of calibration element 65 is optically coupled to UUT 110 via common shelf 100. The common shelf 100 is a specially designed module shelf having a backplane and various adapter cards for adapting different types of modules. In general, common shelf 100 accommodates different modules that may have different form factors, sizes, and connection requirements. The specific construction of common shelf 100 will vary depending upon the modules to be tested.

An optical jumper 105 such as a pigtail may be used to jump or bypass the common shelf 100 and UUT×110. Optical jumper 105 may be used to calibrate the instruments 130, 140, 150, 160 as further described below in the operation section.

An output switch (B) 120 is optically coupled to the output of the UUT×110. At this stage, the UUT×110 has processed the input optical signal which is now ready for testing. Output switch 120 permits the output optical signal from UUT×110 to be routed to a particular test equipment such as optical power meter 80, digital communication analyzer (DCA) 130, wavelength meter 140, SONET Rx 150, or SDH Rx 160 each of which are conventional test instruments. The invention is not limited to the particular test instruments illustrated in the figures and may utilize other test instruments or processes.

As mentioned above, the SONET Rx 150 and SDH Rx 160 are conventional optical test instruments typically capable of performing a variety of tests such as a bit error rate test (BERT), loss of signal (LOS) test, and loss of frame test (LOF).

The wavelength meter 140 is particularly helpful for testing/calibrating the wavelength stabilization of a transmitter or transceiver. Many transmitters and receivers use feedback loop that monitors the wavelength stabilization (e.g. a DFB laser with a bragg grating). This feedback loop and the stability of the output wavelength may be tested by the wavelength meter. By using the controller 70 together with the wavelength meter, the wavelength of the optical signal output by UUT 110 may also be tuned and calibrated.

While FIG. 1 illustrates a simplified system architecture relative to a single UUT×110 and shows both the input and output sides for rapid understanding, FIG. 2 illustrates only the input side of the preferred system and shows a plurality of UUTs 110 that may be simultaneously and asynchronously tested and calibrated by the system.

As shown in FIG. 2, a plurality of tunable laser sources (TLS) 5 are optically coupled to a corresponding remodulator (Rem) 7 which, in turn, are optically coupled to corresponding optical signal degradation elements (e.g. a combination of VOA 30 and optical amp 40 as in FIG. 1). The outputs of the optical amps 40 are preferably provided to a single OSA 50 via optical switch 55. In this way, the relatively expensive and infrequently utilized (relative to the other test equipment) OSA 50 may be shared between the plurality of optical signal generators (e.g. TLS 5 and Rem 7) and degraders (e.g. VOA 30 and optical amp 40). The method of sharing OSA 50 is further described below in the operation section.

Remodulator (Rem) 7 is essentially an O/E/O (optical/electrica/optical) signal conversion unit that maps or translates the input wavelength to a different output wavelength. In other words, remodulator 7 receives an optical signal typically within a relatively broad wavelength range, converts it to an electrical signal which is then used to drive optics (e.g. typically long reach (LR) or very long reach (VLR) but perhaps very short reach (VSR) or short reach (SR)) that outputs an optical signal at a precise wavelength (e.g. one of the channels of a WDM system).

Examples of remodulators are described in, for example, U.S. Pat. Nos. 5,504,609; 5,784,184; 5,726,784 the contents of which are hereby incorporated by reference.

Remodulators 7 are quite useful in WDM equipment that must interface with legacy equipment such as SONET equipment because legacy equipment typically utilizes a different wavelength that the wavelengths used by WDM equipment. For example, a typical SONET signal is transmitted at 1310 nm while WDM equipment uses wavelengths in, for example, 1500 nm to 1600 nm.

An advantage of using remodulator 7 is that a certain batch of optical modules to be tested (the UUTs 110) may be manufactured for a specific channel wavelength and it is convenient to use a remodulator 7 that outputs that expected, specific wavelength rather than use the TLS 5. Some remodulators 7 also have the capability to change the output wavelength in response to a command which is another useful capability for testing UUTs 110 expecting different input wavelengths.

As with FIG. 1, FIG. 2 shows another way of generating optical input signals using a SONET transmitter 10. Some of the various line rates such as OC-48 and OC-3/12 that may be used by the invention are shown each of which may be selected via optical switch 16 and supplied to remodulator 7 and receiver 20. If the SONET transmitters 10 are capable of a variety of line rates, then switch 16 may be eliminated.

As further shown in FIG. 2, input switches 60 switch between the various optical test signal inputs and provides a selected one of the switched signals to the corresponding UUT 110.

Rather than use calibration element 65 including both a VOA and switch as in FIG. 1, FIG. 2 shows another alternative which is to tap a part of the optical signal headed for each UUT to a corresponding power meter (POW) 80. The taps are preferably made from the outputs of VOAs 62. This configuration eliminates one of the optical switches and supplies the power meters 80 with the respective input signals full-time. By knowing the tap percentage the power level received by UUT 110 may be estimated.

FIG. 3 illustrates the output side of the inventive architecture and shows a plurality of UUTs 110 that may be simultaneously and asynchronously tested and calibrated by the system.

As shown in FIG. 3, output switches 120 are optically coupled to corresponding UUTs 110. Various test instruments such as optical power meters (Pow) 80, wavelength ($\lambda$) meters 140, SONET receivers 150, and SDH receivers 160 are optically coupled to the output switches 120.

Various splitters may be used as shown to share optical signal paths. For instance, a first splitter 170 may split the output optical signal so that it may be shared by the wavelength meter 140 and receivers 150, 160 and a second splitter may be used so that both of the types of receivers 150, 160 may share the output optical signal. Such splitters 170, 175 are considered optional and may be eliminated entirely if a larger capacity switch 120 is used. To save the cost of such larger-capacity switches, the splitters such as splitters 170, 175 may be advantageously used particularly if the signal strength is sufficient downstream of the splitter(s).

The power meter 80 is preferably not provided downstream of a splitter because it may affect the accuracy of the optical power measurement of the signal output from the UUT 110. Of course, if the tap percentage is known then an estimation may be made as described above.

FIG. 4 illustrates a generalized switching architecture that may be used by the invention. For simplicity, noise generation and calibration components (e.g. VOA 30, optical amp 40, attenuator with switch 65 and jumper 105) are not shown in FIG. 4. The input and output switches 60, 120 are shown respectively coupled to the inputs and outputs of corresponding UUTs 110.

Optical signal sources 6 are generalized representations of optical signal sources of any kind including the ones shown and described in relation to FIGS. 1 and 2. Likewise, the measuring instruments 170 are generalized representations of optical signal measuring instruments of any kind including the ones shown and described in relation to FIGS. 1 and 3. Optical power meters 80 are switchably connected to each UUT 110 to perform power calibrations of the UUTs 110 and the optical test station (losses or fibers, connectors, splices, switches, etc).

As is apparent from FIG. 4, an optical signal from any one of the optical signal sources 6 may be fed to a UUT 110 by input switch 60. Likewise, the output from any one of the UUTs 110 may be supplied to one of the test instruments 170 or power meters 80. Due to the high cost and relatively infrequent use (relative to other test instruments 170) of certain equipment such as OSA 50 and DCA 130 switches 55 and 125 may be used to share these devices among the UUTs 110. In other words, switches 55 and 125 may be used to more efficiently utilize certain testing resources such as the OSA 50 and DCA 130.

Figure 5:
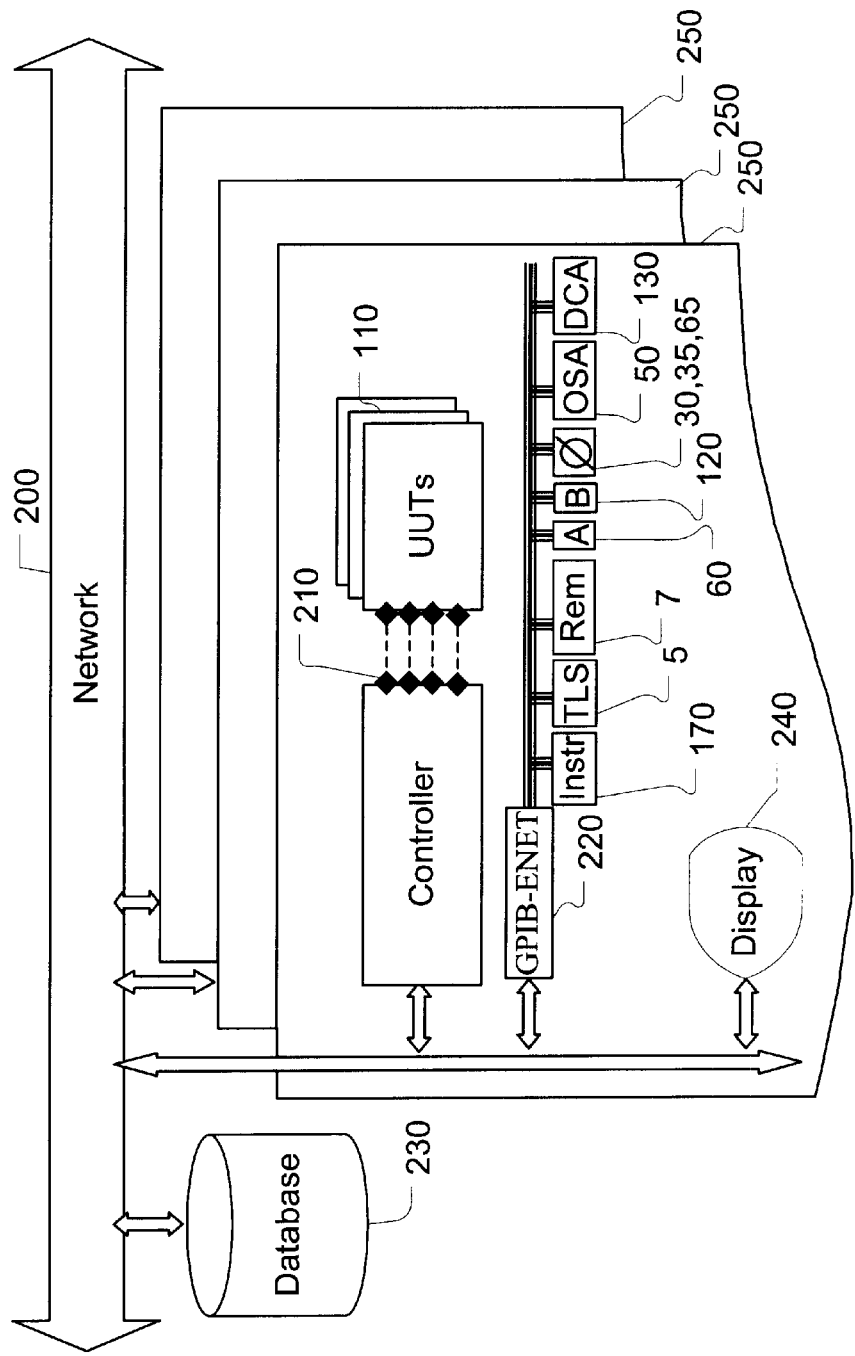
FIG. 5 is a block diagram illustrating a network of optical module test systems according to the invention and further illustrating electrical connections between the controller, the test equipment, switches, remodulator, and variable optical attenuators for one of the systems.

FIG. 5 illustrates the preferred way of electrically connecting the components of the system. In general, a network-based connection is preferred. Particularly, network 20 serves as a backbone connecting a plurality testing/calibration systems 250 and providing a pathway to the common database 230. Each of the testing/calibration systems 250 preferably uses the optical architecture outlined in FIGS. 1–4.

A controller 70 may be connected to the network 200 via Ethernet. The UUTs may be connected to the controller 70 via serial COM (communication) ports 210.

Although the network architecture shown in FIG. 5 utilizes particular types of connections and protocols such as GPIB, Ethernet and serial COM it is to be understood that other types of connections and protocols are contemplated herein.

Controller 70 may be constructed in a variety of fashions utilizing electronic components, optical components, computer hardware, firmware, software or a combination thereof. Typical examples in the electronic domain include FPGAs (field programmable gate arrays), ASICs (application specific integrated circuits), and microprocessors such as a general purpose microprocessor programmed with inventive software as outlined below. Due to the low cost, high availability, and ease of programming a personal computer is generally preferred to implement controller 70. Preferably, the controller 70 also includes a memory unit the purpose of which will be explained below.

As further shown in FIG. 5, each testing/calibration system 250 includes an extension of the network 200 to which are connected the controller 70 and a GPIB-ENET 220 interface. Test instrument (instr) 170; TLS 5; remodulator 7; input switch (A) 60; output switch (B) 120; VOAs 30, 35, 65; OSA 50; and DCA 130 are connected to the network 200 backbone via the GPIB-ENET 220 interface.

Although only one test instrument 170, one TLS 5, one remodulator 7, one input switch (A) 60, one output switch (B) 120; one OSA 50; one DCA 130 and one set of VOAs 30, 35, 65 are shown in FIG. 5, it is to be understood that a plurality of such devices are preferably connected to GPIB-ENET 230 such as the plurality shown in FIGS. 1–4 to enable simultaneous testing of plural UUTs 110.

As further shown in FIG. 5, a display 240 is also included within the network architecture. The display may be connected directly to the controller or via the network as shown. Display 240 is a conventional element and may be implemented with a cathode ray tube, LCD, or other image display technology.

By using a network architecture such as the one shown in FIG. 5, the controller 70 may send control signals and receive responses and data to/from each of the test instruments 170, the TLSs 5, the remodulators 7, input switches (A) 60, output switches (B) 120 and VOAs 30, 35, 65.

Furthermore, the COM port 210 connections between the controller 70 and UUTs 110 permit the controller 70 to send commands to the UUTs 110 and receive responses and data from the UUTs 110. The data collected from the UUTs 110 in this fashion varies depending upon the particular UUT 110 being tested but typically includes such things as temperature, current, voltage and other parameters internal to the UUT 110 being tested.

Operation of Invention

Generally speaking, the invention preferably utilizes a finite state machine model to operate the various functions and methods of the invention. State transitions are governed by triggering events such as inputs to the state machine, previous state and past states. The state machines 300 of the invention are implemented in the controller 70.

Figure 6:
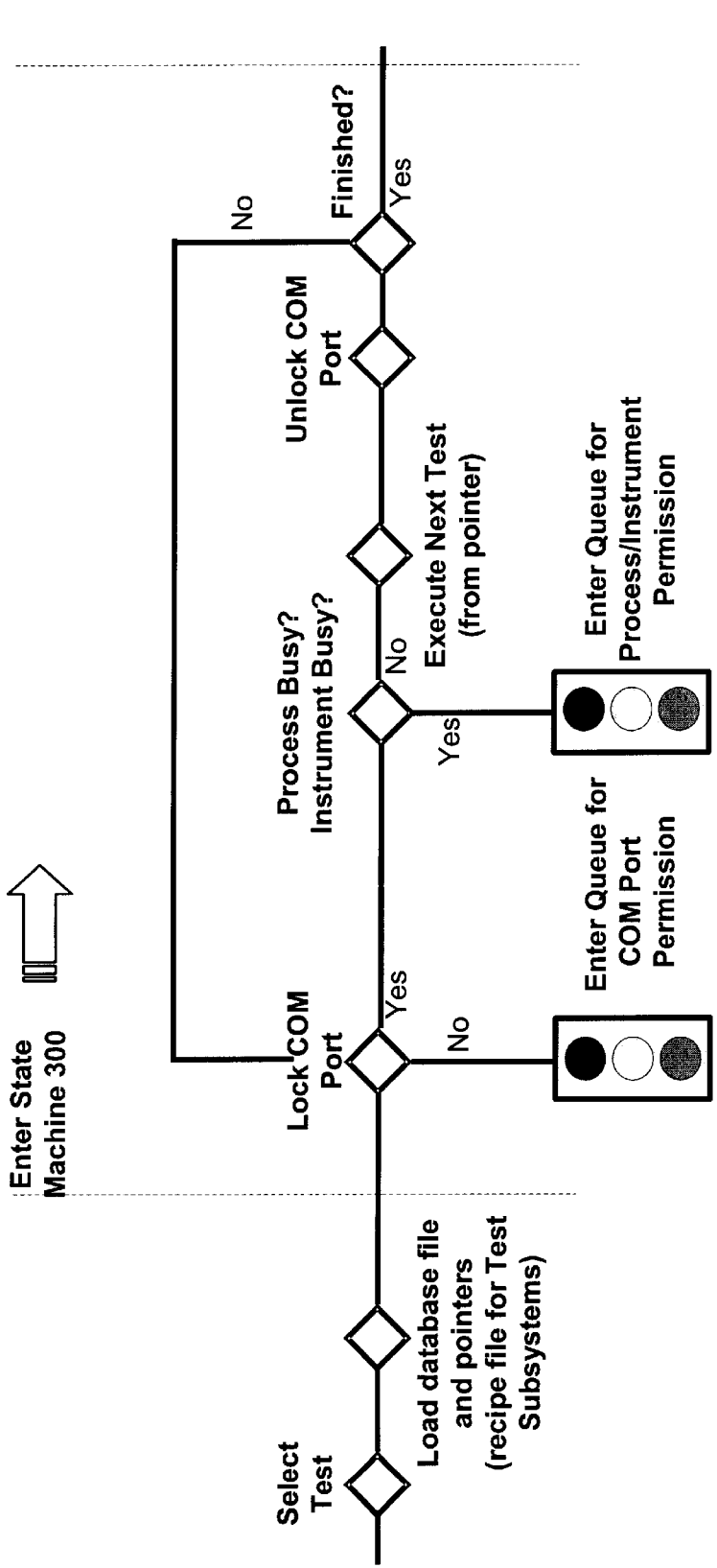
FIG. 6 is a diagram illustrating a method of parallel asynchronous optical port testing using a state machine according to the invention.

FIG. 6 illustrates the inventive state machine 300 and events that trigger the activation of the state machine 300. As shown therein, the general process of the invention begins with plugging in the module to be tested (UUT 110) into the common shelf 100 and selecting a test to be performed on the module. This selection may be performed by conventional input devices (not shown) such as a mouse, keyboard, or touch screen connected to the controller 70 perhaps aided by the display 240. The test selection is from among available optical testing routines details of which are stored in the database 230.

The test selection also includes identifying the particular module that will be the UUT 110. Such identification is conveniently performed by using a bar code scanner and bar code label attached to each optical module. The bar code will uniquely identify the optical module (e.g. by a serial number) that will be the UUT 110 as well as the module type (e.g. by product number).

In response to the test selection, the invention then loads a database file and associated pointers from database 230 which can be thought of as a test recipe file for conducting the selected test on the particular module that will be the UUT 110. This test recipe includes specific information about the particular UUT 110 such as channel wavelength, line rate, input/output signal level ranges and other operating parameters as well as control information for the various test subsystems such as the test instruments 170 and switches 60, 120. This database file may be loaded by the controller 70 from the common database 230.

After the database file is loaded, the state machine 300 is then entered as further indicated in FIG. 6.

The state machine 300 utilizes locking mechanisms to perform parallel, asynchronous testing of a plurality of UUTs 110. The system architecture described above has certain limited resources which should be reserved or "locked" just prior to and during use. Such locking prevents interference between competing testing/calibration routines that need to use a particular resource.

The COM ports 210 are one such resource that is locked just prior to and during use. Locking a COM port 210 preserves a communication channel such that it may be used for a particular testing or calibration routine. Preserving or locking a communication may involve a variety of techniques such as exclusive use of the communication channel between the controller 70 and the UUT 110 during the entire test period, reserved time communication time slots during the test period, reserved communication frequencies or CMDA (code division multiple access) codes or any other technique for ensuring a communication channel that is not subject to interference from other testing or calibration routines.

Some optical modules, such as a transceiver or a two channel receiver that may be plugged into the common shelf 100 and thereby become a UUT 110 have more than one optical port (e.g. a top and bottom port which may correspond to a SR to LR and LR to SR interface). Preferably, each UUT 110 optical port optically communicates with a separate optical port of the common shelf 100 and electrically communicates with the controller 70 via separate COM ports 210.

By locking the COM port 210, the state machine 300 ensures that communication between the controller 70 and UUT 110 will relate only to one of the optical ports (e.g. SR to LR) and that commands and responses sent between the UUT 110 and controller 70 will not be confused or otherwise interfere with the other optical port (e.g. LR to SR). In other words, the state machine assigns or locks an available one of the COM ports 210 to preserve a undisturbed communication channel between the controller 70 and UUT 110 during the selected testing and/or calibration routine or step thereof. Locking also applies to different ULTs 110.

If the state machine 300 is unable to lock a COM port 210, then the selected test will enter a queue and await COM 210 port permission. The traffic stop sign symbol illustrates this stop and go queue based permission scheme. For example, if no COM port 210 can be locked, then the system is at full capacity and cannot asynchronously initiate another test at that time.

The state machine 300 also includes a state that determines whether the testing instrument 6 or testing/calibration process is currently busy. In other words, if the selected test requires the use of a certain test instrument 6 and that instrument 6 is busy testing another UUT 110, then the state machine will not allow that testing instrument resource to be utilized for the selected test and will permit the testing of the other UUT 110 to continue. This is another aspect of resource locking that the invention utilizes to perform parallel asynchronous testing of a plurality of modules (UUTs 110).

As an illustrative example, recall that the DCA 130 and OSA 50 are preferably shared resources in which switches 125, 55 may be respectively actuated by controller 70 to share the DCA 130 and OSA 50 between different UUTs 110. Thus, the DCA 130 itself as well as the OSA 50 and their respective upstream switches 125, 50 are further examples of shared resources that may be busy or otherwise not available. The invention preferably locks these equipment resources prior to use.

The resource locking concept also applies to processes such as a manual adjustment of a testing instrument 6 or finishing of a testing process such as an eye pattern test by the DCA 130 which may take several minutes to complete. Resource locking of the OSA 130 and its upstream optical switch 55 would also be required when configuring the optical signal-to-noise ratios for LR inputs of a UUT 110.

If the process or instrument is busy then the selected test will enter a queue similar to the COM port permission queue. The test(s) in this queue will wait until the required instrument or process is no longer busy before the state machine transitions to the execution state to execute that test. Again, the traffic stop sign symbol illustrates this stop and go queue based permission scheme and permits asynchronous initiation of tests as instruments and processes become available.

Once a COM port 210 is locked and the required process and instrument are not busy, the state machine 300 transitions to an execution state in which the execution of the next test is initiated. The selected optical test usually involves a series of steps each of which may be indicated by a pointer. The execution of the next test may be performed by referring to this pointer and executing the next test within the optical test sequence. Remember that the database file downloaded from common database 230 includes these pointers and acts as a recipe for conducting the selected optical test sequence.

Although an optical test may include a single step it is more likely that an optical test is actually a sequence of test procedures. One way in which to implement the resource locking concept is to design the test recipe such that it includes the sequence of test procedures as well as including steps that perform resource locking for a next resource or set of resources to be utilized in the next optical test of the test sequence.

After completing the selected optical test sequence for the UUT 110, the state machine 300 releases or "unlocks" the locked COM port 210. The next optical test in the COM port permission queue will then be able to lock the released COM port 210 and proceed with the next test.

After unlocking the COM port, the state machine 300 then determines whether all of the optical tests have finished. If so, then the state machine is no longer needed and controller 70 awaits the next optical test to be selected. If not finished, the state machine 300 transitions to the lock COM port state which is discussed above.

Taking a step back for a moment, the state machine transitions shown in FIG. 6 are for a single state machine. It is to be understood that a plurality of state machines 300 are preferably utilized such that the system can perform parallel, asynchronous testing. Each state machine 300 uses the resource locking and queue concepts to reserve the resources required for each of the selected tests. An operator running the system will continue scanning in modules to be tested, loading them into the common shelf 100 and selecting optical tests thereby triggering parallel state machines 300 to be launched to deal with the load.

Figure 7:
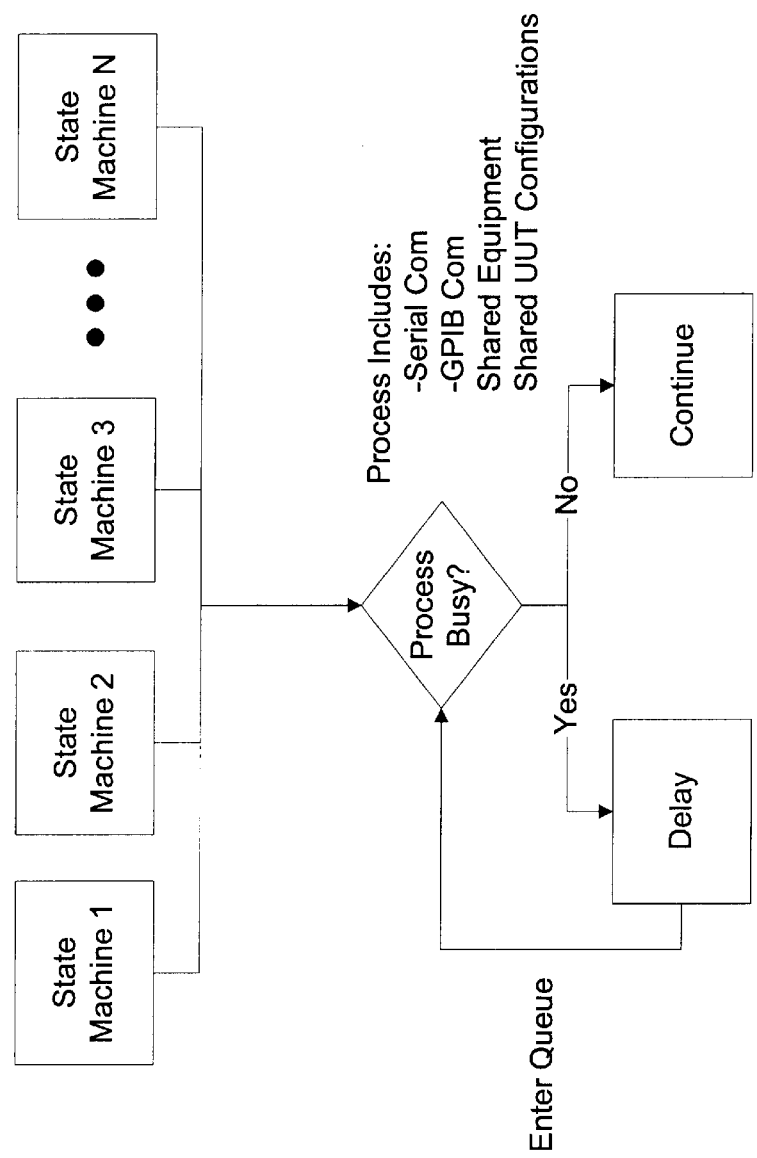
FIG. 7 illustrates the invention's use of multiple state machines and a high level state machine process flow for performing parallel asynchronous optical module testing.

FIG. 7 generally illustrates this parallel operation of plural state machines 300. Each of the state machines (1 through N) is launched when the operator logs in a module (e.g. scans in the module for identification, plugs the module into the common shelf 100 and selects an optical test). Each state machine then generally proceeds by checking to see if the required process (e.g. COM port 210, testing instrument, or process) is busy. This step is a diagrammatic simplification of the state transition and resource locking processes more particularly described in relation to FIG. 6. The processes include serial communications (COM port locking), GPIB communication (another aspect of COM port locking), shared equipment (instrument 6 availability), and shared UUT configurations.

An example of a shared UUT configuration would be the validation of Factory Data (factory settings loaded onto the UUT 110 such as operating parameters). Factory Data may be sent by the controller 70 to a UUT 110 a single time. However, this Factory Data may be applicable for more than one port of the UUT 110 (e.g. a two channel receiver module). In other words, the Factory Data may be a shared UUT configuration that is shared among different ports of the same module (UUT 110).

If the process is busy, then it enters a queue and awaits (delays) before checking whether the process is still busy. If the process is not busy, then the corresponding state machine 300 will continue by executing the selected test as outlined above and further described below in relation to FIG. 8.

Figure 8:
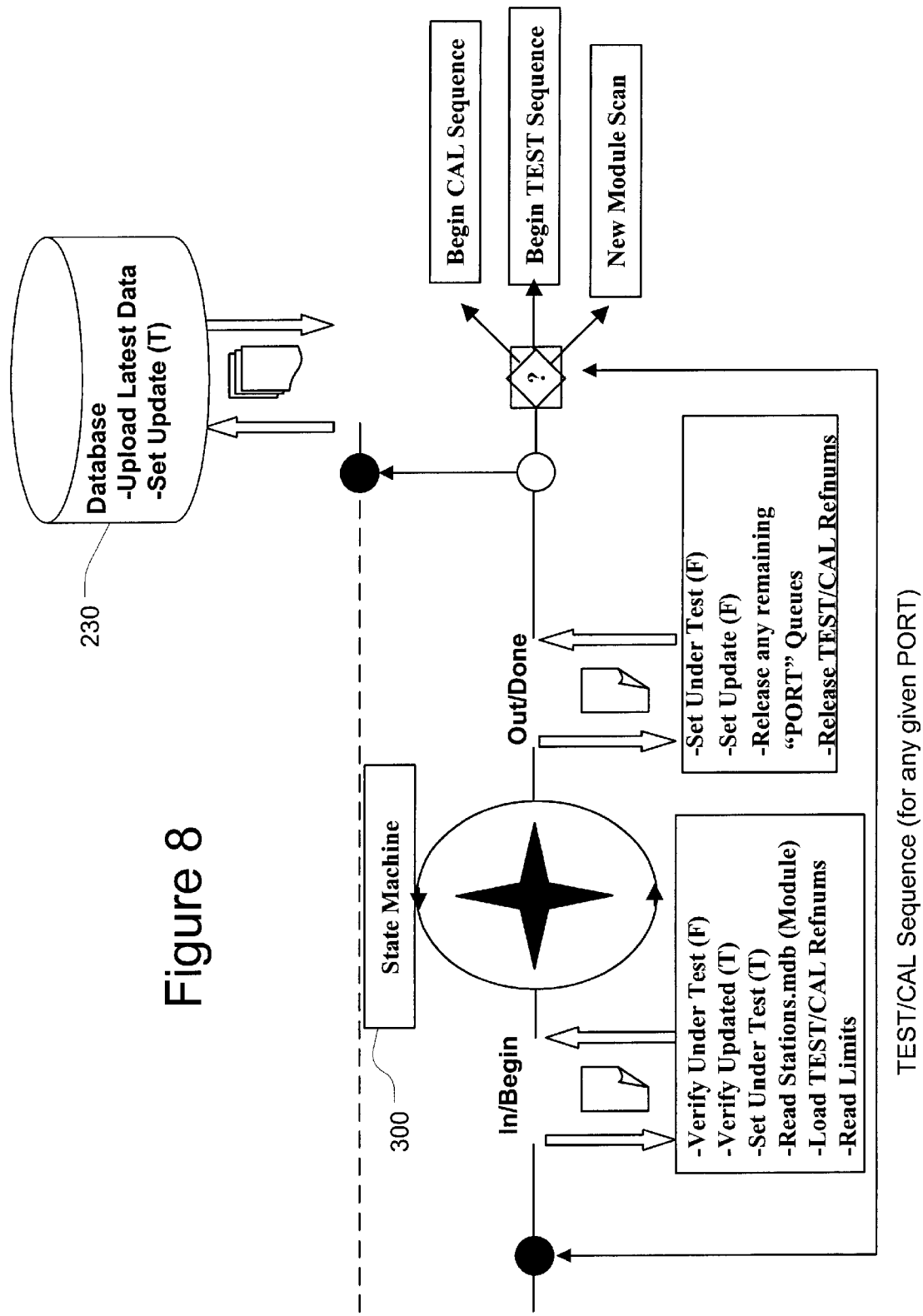
FIG. 8 is a process flow diagram further illustrating how the state machine of the invention performs parallel asynchronous testing of optical modules.

FIG. 8 further illustrates one of the state machines 300 during an execution state. FIG. 8 also illustrates the interaction between the state machine 300 and the common database 230.

The star shaped symbol in FIG. 8 represents the state machine 300 and its transitions during execution of an optical test. The dotted line at the top of FIG. 8 represents the parallel operation of the common database 230.

Working from left to right in FIG. 8, the state machine 300 downloads the database file and pointers from the database 230 for the selected test a process which is represented by the document exchange symbol. The state machine 300 then proceeds to perform several functions on this datafile and uses flags (indicated by (F) for False and (T) for true) to coordinate the test and data with the common database 230.

For example, the state machine verifies the UUT 110 by checking the flag associated with the particular UUT 110. This association is possible because each UUT 110 is uniquely identified by, for example, a serial number that may scanned in by a bar code reader. The common database 230 has a set of datafiles for each UUT 110 and a verification should be performed before proceeding further. This verification checks, for example, whether the UUT is already under test. If so (flag=T), then something is amiss (e.g. executing a different test on the UUT 110 while another test is ongoing is an error condition). If not already under test, the state machine then sets the under test flag (T=true) to prevent other state machines from testing the same UUT 110. This under test flag acts as an interlock to prevent more than one state machine from testing a particular UUT 110.

The state machine 300 also verifies whether the datafile associated with the UUT 110 has been updated. In other words, were the last test results properly uploaded to the common database 230 such that adding new data is proper.

Furthermore, the state machine 300 reads the stations.mdb (shown in FIG. 9) from controller 70. This stations.mdb is a preferably local database local to each controller 70 and separate from the common database 230 since it stores data concerning the local hardware configurations such as switch (e.g. switch 55, 60, 120 and 125) positions and hardware protocol and descriptions specific to each optical test port. This information will be parsed real-time during the test process to dictate which instrument driver will be used to talk to the particular type of measuring instrument 170.

The Test/Cal References may also be kept in the stations.mdb database. These reference values include associated optical power loss through the various attenuators, fiber and optical connections in order to account for the loss through the test system and otherwise calibrate each of the optical testing signal paths.

The state machine 300 also loads the TEST/CAL Refnums (testing/calibration reference numbers) and reads Limits (thresholds) which is a set of testing/calibration parameters and thresholds particular to the UUT 110 being tested. The TEST/CAL refnums are also utilized to tune or adjust the testing process and include such numbers as the channel wavelength (e.g. to adjust the TLS 5 and optical power meter 80), input/output power level tables, etc.

The Limits include various thresholds or standards against which the test data is compared to determine a Pass/Fail condition or otherwise diagnose a UUT 110. For example, the Limits may include the wavelength stability of an optical transmitter, the input/output power accuracy, laser output current, laser temperature, grating temperature, receiver sensitivity, Q, extinction ratio, crossing, eye crossing, bit error rate, jitter, and other physical measurements as governed by standards bodies such as Telcordia or internal standards and specifications.

The state machine 300 then executes the actual test/calibration sequence. Examples of such test sequences are discussed below in relation to FIGS. 12–14 and FIGS. 11*a* and 11*b* describe calibration routines.

After executing the test/calibration sequence and collecting testing and calibration data, the state machine then transitions to an out/done state in which various flags are set. Specifically, the set under test flag is set to False since the UUT 110 is no longer under test. The update flag is also set to False and the COM port 210 TEST/CAL Refnums are released (unlocked) for use by another state machine or the same state machine in a later test execution sequence.

The test/calibration data is then uploaded to the common database 230. The update flag is reset (set to True).

The state machine 300 may then begin a CAL (calibration) sequence, test sequence or scan in a new optical module depending upon operator input. In other words, the system may start a new process selected by an operator. The operator may select whether she wishes to scan in a new module, begin/continue testing an existing module, or run a calibration sequence.

The CAL (calibration) sequence referred to in FIG. 8 is a calibration of the optical test system 250 which includes using the power meter 80 to measure optical power losses across the various fiber patch cords, connectors, switches, etc that exist in the optical signal test path as generally shown in FIG. 1. The CAL sequence may be initiated manually or may be triggered at regular intervals such as after a certain period of time or after a certain number of tests have been run.

To implement this auto CAL process, for example, one of the reference numbers existing in the Stations.mdb file may the time of last calibration (or last test sequence number). If a certain amount of time has expired since the last calibration (or a certain number of tests have been conducted since the last calibration), the controller 70 will not permit the operator proceed with testing and must first calibrate that particular port.

Figure 9:
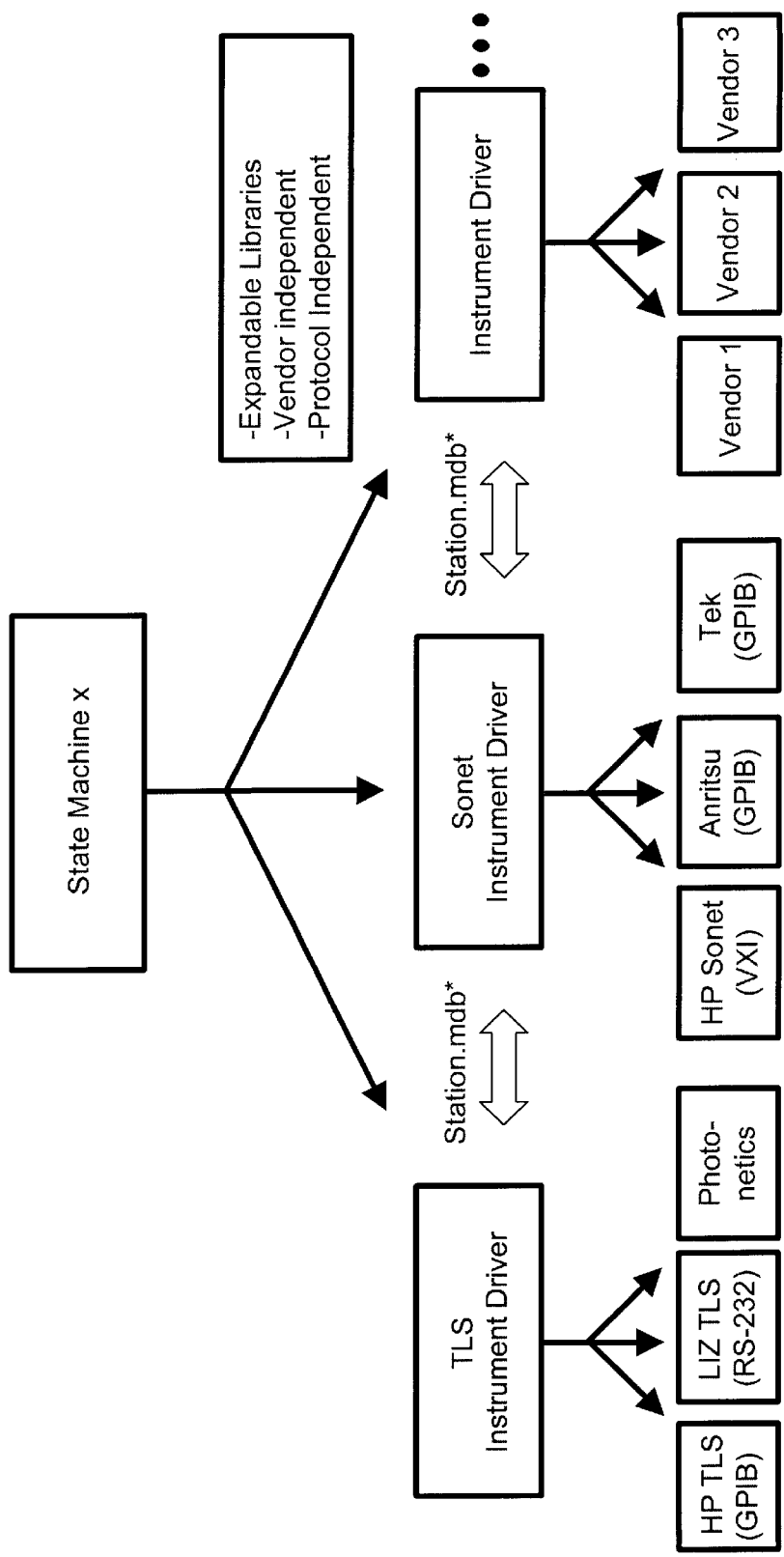
FIG. 9 is a data diagram illustrating a state machine according to the invention and the relationship of the inventive state machine to instrument control.

FIG. 9 illustrates the relationship between each of the state machines 300 (e.g. state machine x) and various instrument drivers. In order to communicate with and control the various instruments (e.g. TLS 5, SONET Tx 10, SDH Tx 12, wavelength meter 140, SONET Rx 150, SDH Rx 160) instrument drivers may be utilized as illustrated in FIG. 9. Each of the instruments may be manufactured by a different company and utilize different communication protocols and control commands.

The instrument drivers shown in FIG. 9 illustrate the different instrument drivers and includes a generalized instrument type driver block that includes a variety of different vendors that may supply the instrument. Indeed, the system includes expandable libraries of instrument drivers that are vendor and protocol independent thereby enabling the invention to utilize any instrument from any vendor.

Figure 10:
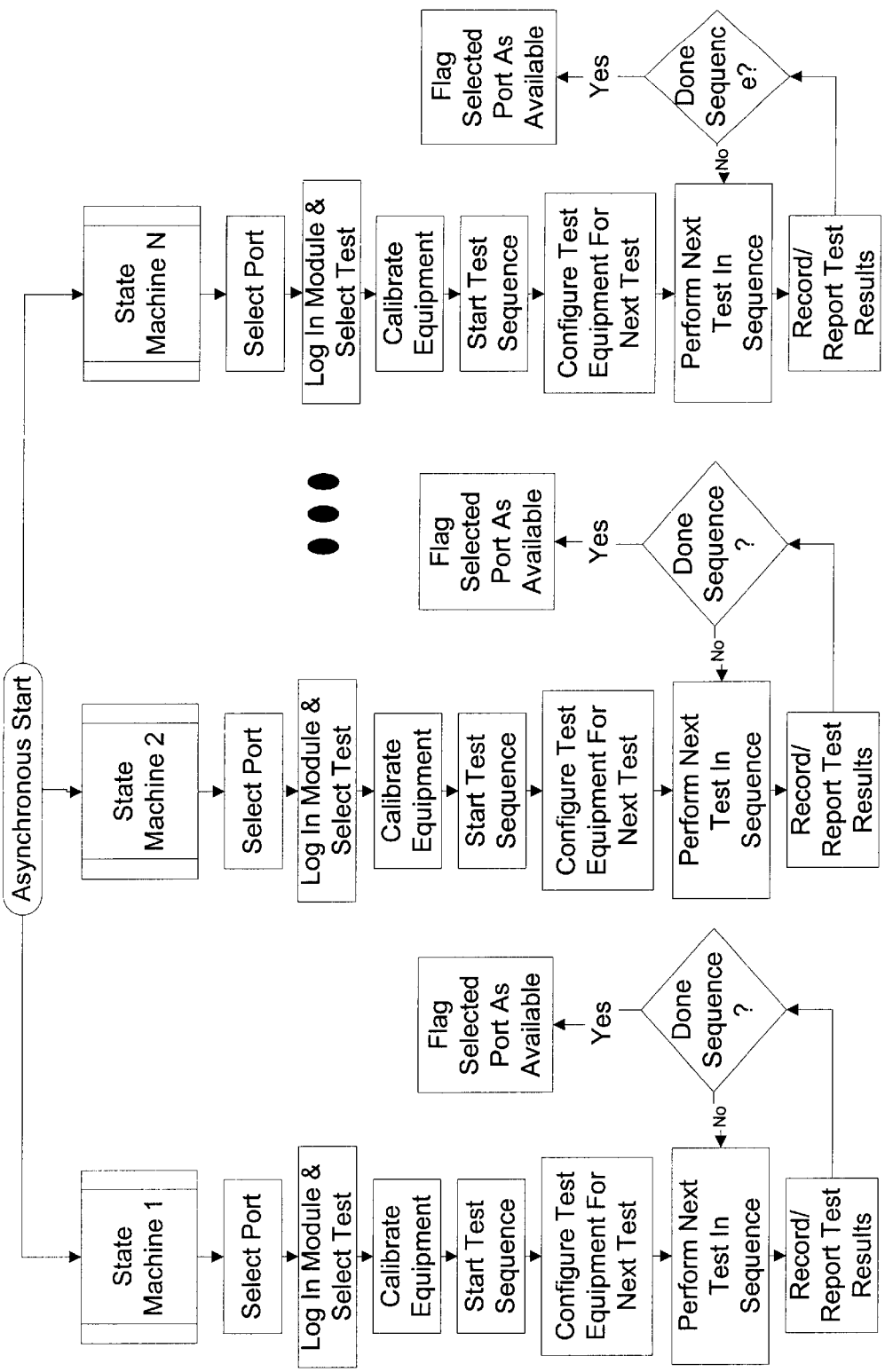
FIG. 10 is a flowchart illustrating steps that may be performed by each of the state machines of the invention to perform parallel asynchronous testing of optical modules.

FIG. 10 further illustrates a method that may be performed in parallel by a plurality of state machines 300 (state machine 1, state machine 2 . . . state machine N). For simplicity, many of the resource locking features (described in relation to FIGS. 6 and 8) are omitted from this flowchart so that the general testing and calibration methods may be more rapidly understood.

The start icon in FIG. 10 is intended to illustrate an asynchronous start of method for each of the independent state machines 300. The method performed by each state machine includes selecting a port (e.g. selecting one of the COM ports 210 for the UUT 110). The module may then be logged in by, for example, using a bar code scanner and bar code label that identifies the specific UUT 210 (module). The test or calibration of the UUT 210 to be performed may also be selected at this stage.

After logging in the UUT 210, the testing equipment may need to be calibrated or otherwise configured for the selected test and particular UUT 210. This includes, for example, adjusting the TLS 5 for the UUT's 210 expected channel wavelength; commanding the SONET Tx 10 to output a test signal at a desired line rate; adjusting the optical signal quality by configuring the optical signal degraders (e.g. VOA 30) for a desired S/N ratio; configuring the SONET Rx for a particular type of test to be conducted; and throwing the input and output switches 60, 120 to route the appropriate optical input signal to the UUT 210 and route the signal output from the UUT 210 to the appropriate test equipment 6.

After calibrating or otherwise configuring the equipment, the state machine then starts the test sequence. It is to be noted that this test sequence start is an asynchronous start relative to the other state machines 300. If the test sequence includes multiple steps requiring a reconfiguration (or additional resource locking) of the test equipment or process, then such configuration (or resource locking) should take place before the next test in the sequence is performed. This configuration and test performance loop continues until the sequence is done whereupon the COM port 210 is flagged as available. The rest results are also recorded by the controller 70 and reported to the common database 230.

Figure 11A:
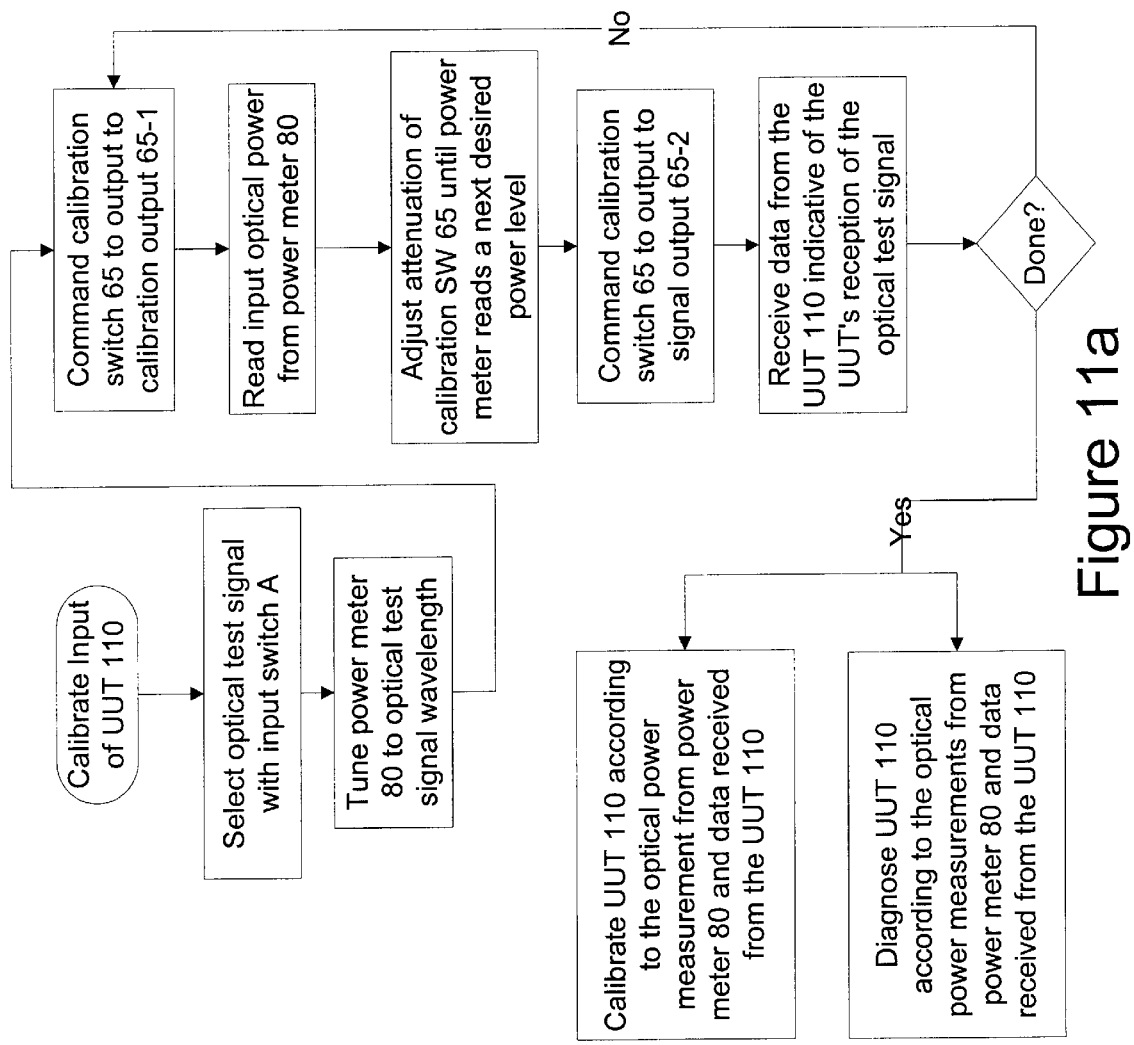
FIG. 11a is a flowchart illustrating an optical module input calibration routine according to the invention.

FIG. 11a illustrates a calibration routine for calibrating the input of UUTT 110. Some modules such as receivers and transceivers typically utilize a photodetector to perform an O/E conversion of the input optical signal. This photodetector should be calibrated for optimum performance and the inventive system is an excellent tool for performing this calibration.

As shown in FIG. 11a, the input calibration process selects an optical test signal to the input optical calibration signal. This may be performed by the controller 70 commanding one of the optical signal sources 6 to generate an input optical signal and commanding the input switch (A) 60 to select one of the input optical test signals. The power meter 80 is preferably tuned to the wavelength of the input optical test signal.

Calibration switch 65 is then commanded by the controller 70 to switch to the calibration output port 65-1 so that the input optical test signal may be supplied to the optical power meter 80. The controller then reads the input optical power from the optical power meter 80. By using this power measurement, the controller 70 then adjusts the attenuation of calibration switch 65 such that the power meter 80 reads a next desired power level from among a schedule of power values. This schedule of power values, as ensured by the power measurement from the power meter 80, serves as an array of calibration points for calibrating the UUT 110.

As further shown in FIG. 11a, the controller 70 then commands the calibration switch 65 to output the optical test signal to the UUT 110 via output port 65-2. The controller 70 then takes a measurement from the UUT 110 indicative of the UUT's reception of the optical test signal. For example, this measurement may be the output voltage of a photodetector in the UUT 110.

To provide a range of input power values for calibration, the controller 70 loops through the above process and at each iteration adjusts the attenuation of calibration switch 65 to a next desired power level as verified by the power meter 80. Remember, that the calibration switch 65 includes an attenuation element such as a VOA that can adjust the optical power level. The process loops through the switching, reading, and power adjusting steps described above until done at which point an array of data points is available to properly calibrate the UUT 110. This calibration may be performed by the controller 70 programming a calibration table internal to the UUT 110.

As an alternative to the calibration routine of FIG. 11a, the throwing of the calibration switch 65 may be eliminated if the power meter 80 taps a portion of the input signal without using a switch as in FIG. 2.

The controller 70 may also diagnose the input side of UUT 110 according to the optical power measurements from the power meter 80 and the data received from the UUT 110. For example, if the UUT 110 reports no signal received despite adequate input power levels then there is a fault condition.

Figure 11B:
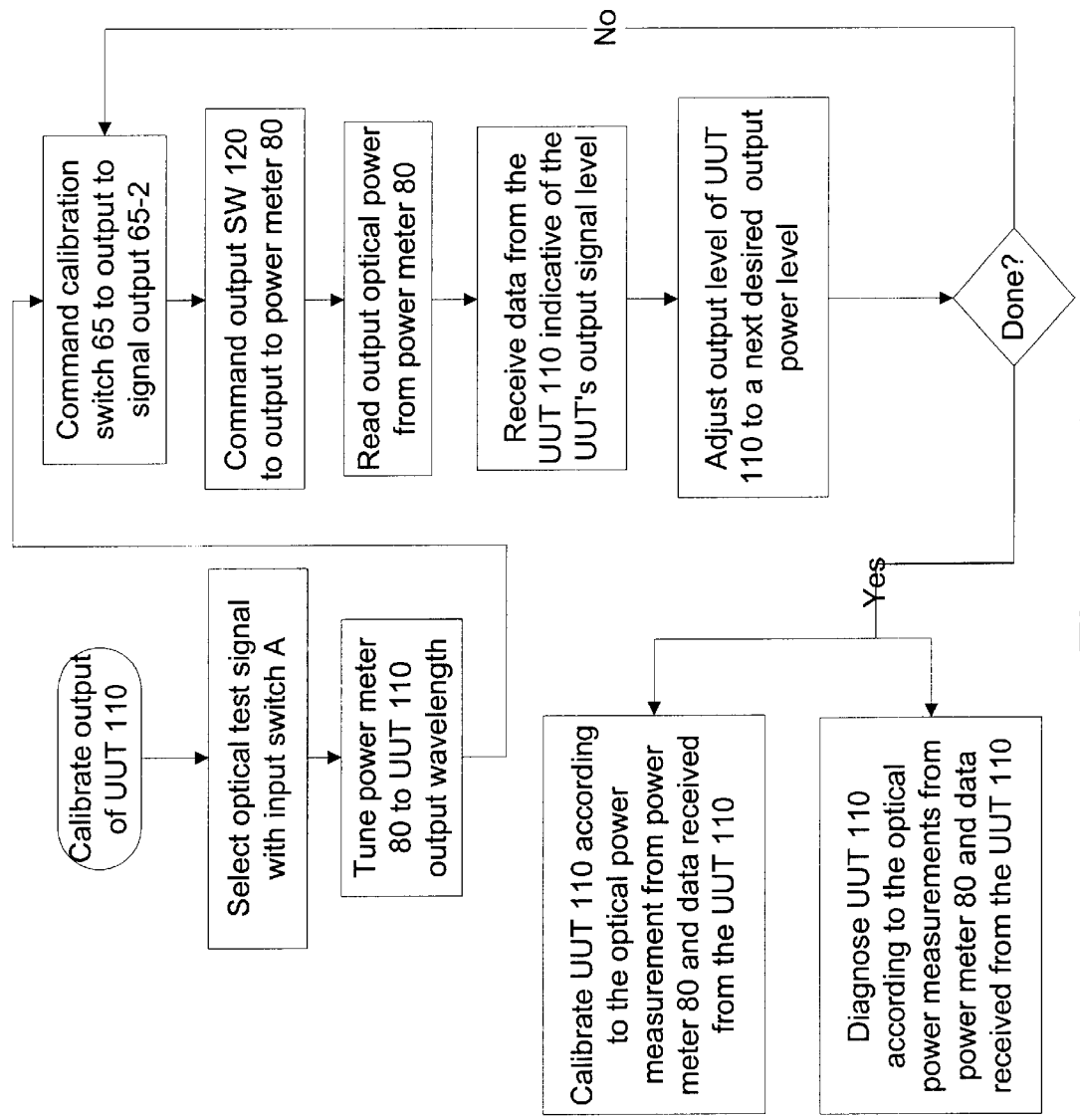
FIG. 11b is a flowchart illustrating an optical module output calibration routine according to the invention.

The output of the UUT 110 may also be calibrated by the invention as illustrated in FIG. 11b. The output of a UUT 110 is an optical signal driven by a laser. Such output lasers may require calibration to operate at peak efficiency. Moreover, such output lasers are often temperature controlled by a TEC (thermoelectric cooler) and such temperature control may also be calibrated.

As shown in FIG. 11b, the output calibration process selects an optical test signal with input switch (A) 60. This selected also include commanding a particular one of the optical signal generators 6 to output an optical test signal. The power meter 80 is then tuned but this time to the output wavelength of the UUT 110 which may differ from the input wavelength.

The controller 70 then commands the calibration switch 65 to output the test signal to the signal output port 65-2 which routes the test signal to the UUT 110. The controller 70 also commands the output switch (B) 120 to route the output signal from UUT 110 to the optical power meter 80. The controller 70 may then input or otherwise receive data from the UUT 110 indicative of the output signal level. This data may include the laser bias current that may be used to control the laser output signal level. The method continues iterating the above steps until done. By gathering an array of data points in this way, the controller 70 may program one or more calibration tables for the output laser.

The controller 70 may also diagnose the output of UUT 110 according to the optical power measurements from the power meter 80 and the data received from the UUT 110. For example, if the power meter 80 reports no signal or an insufficiently strong signal despite a high bias current then there is a fault condition.

The invention may also calibrate other components of a module using a process similar to the ones described above in relation to FIGS. 11a and 11b. For example, a receiver module may include a tunable wavelength selection element such as a thermal or strain regulated Bragg grating that may be calibrated by the system using the wavelength meter 140.

As another example, the output wavelength of a transmitter or transceiver (e.g. a TEC bias current for a transmit laser) may need to be calibrated and the invention is an excellent tool for such calibrations.

Figure 12:
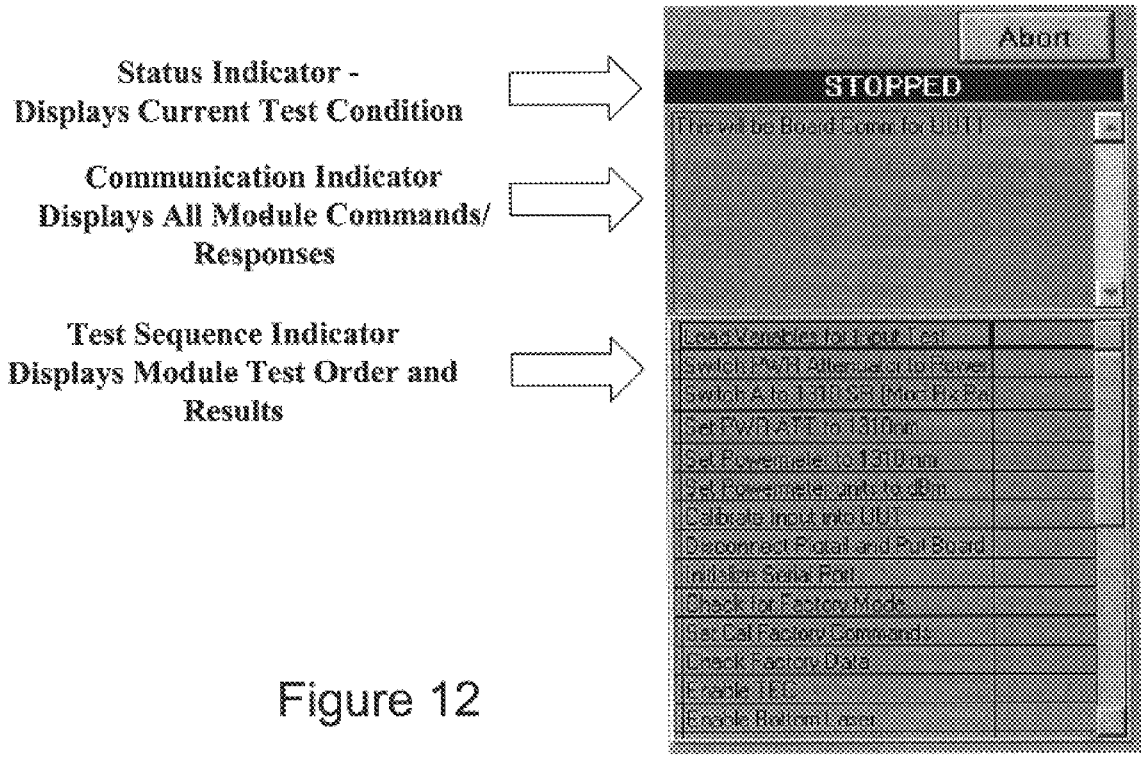
FIG. 12 is an exemplary screen display according to the invention showing a status indicator, a communication indicator and a test sequence indicator.
Figure 13:
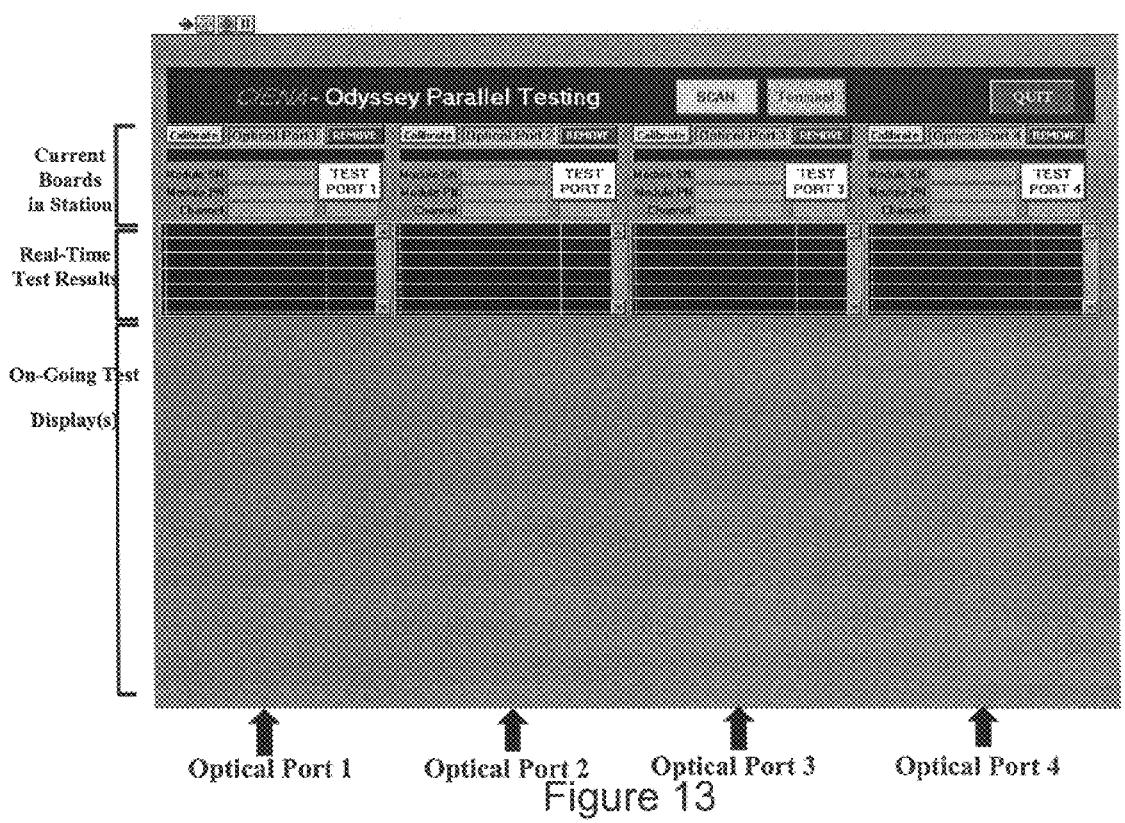
FIG. 13 is an exemplary screen display according to the invention showing various fields of the screen display including columns for different optical ports and rows for current boards in the testing station, real-time test results for each optical port, and on-going test displays for each optical port.
Figure 14:
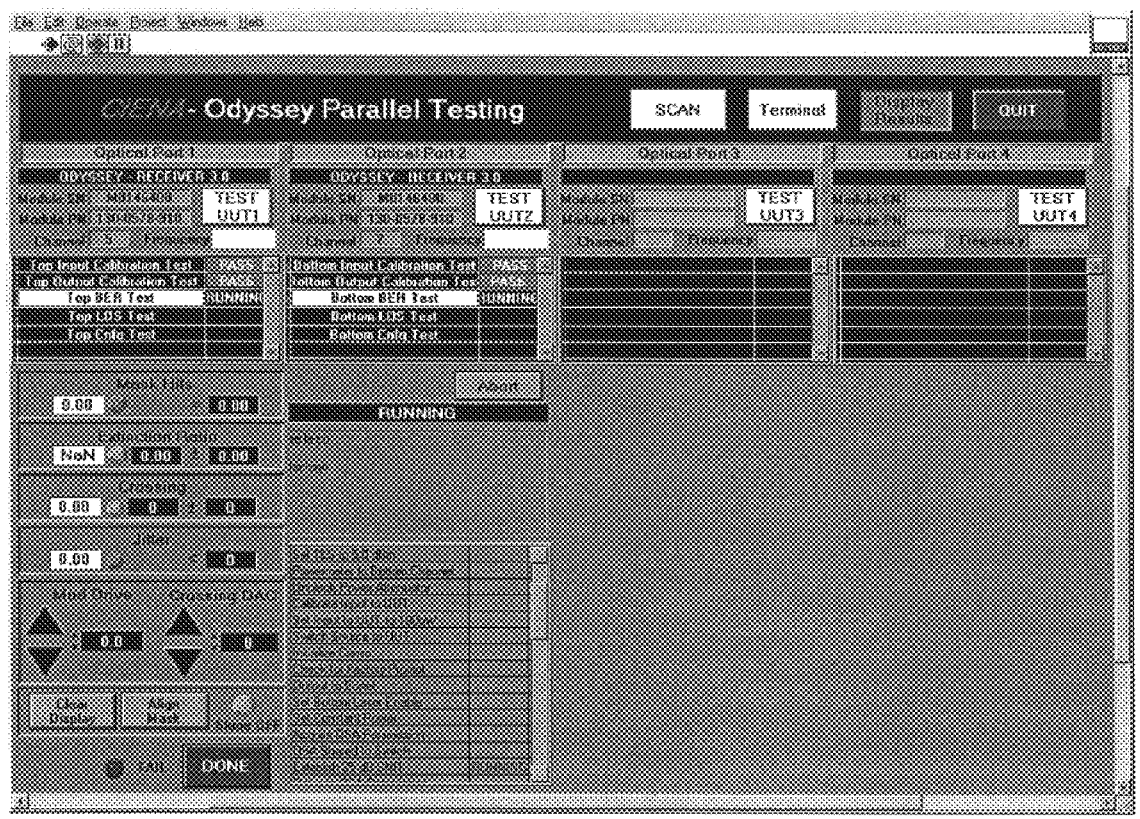
FIG. 14 is an exemplary screen display according to the invention showing real-time test results and on-going test displays for optical ports 1 and 2.

FIGS. 12–14 are exemplary screen displays that may be generated by the invention. These screen displays also help illuminate the various features of the invention.

FIG. 12 graphically illustrates various items being handled by the state machine 300. A status indicator shows the current status of the test condition (e.g. stopped, running, done) and permits an operator to rapidly understand the overall status of that state machine 300 which is particularly useful when a plurality of state machines 300 are running.

As will be seen in later screen displays of FIGS. 12–14 a plurality of state machines 300 may share the screen area of display 240. In general, there may be N state machines which is indicated in FIG. 12 as "State Machine (xN).

FIG. 12 also shows a communication indicator area of the display. This area is used to show the commands sent to the UUT 110 and any responses received from the UUT 110. Many modules that are tested as a UUT 110 have on-board processors or other equipment responsive to commands. For example, a particular UUT 110 may have an on-board microprocessor that can be commanded to place the UUT 110 into different modes, adjust settings, report conditions, send alarms, etc. For certain tests to be completed, it is necessary to place the UUT 110 into a particular state or otherwise control components of the UUT 110. The communication indicator area of the display allows an operator to view the communication between the controller 70 and the UUT 110. This capability has proved quite useful in monitoring the tests and performing troubleshooting.

FIG. 12 also shows a test sequence indicator area that displays the module test order and results. The first column of this area is the test sequence and includes a brief description of each test sequence step. As can be seen, some of these steps are preparatory steps to configure test equipment, throw switches, command the UUT 110, and may even include manually performed steps.

To further illustrate the invention, the following discussion explains the test sequence portion shown in FIG. 12. This test.sequence starts by loading variables for an Input Test. This corresponds to the second step in FIG. 6 in which a database file is loaded from the common database 230 by the controller 70. Next, the calibration switch with attenuator 65 is switched to output to calibration output port 65-1 ("Switch PWR Attenuator to Power") so that the power meter 80 can receive the optical test signal. The next step commands the input switch 60 to route a signal from Rx 20 (in this case a 1310 nm receiver with short reach (SR) optics). The calibration switch 65 and optical power meter 80 are then set to or tuned to the 1310 nm optical test signal. The input of the UUT 110 may then be calibrated.

A manual step then follows which is to disconnect the optical jumper 105 ("Disconnect pigtail . . . ") which is useful for optical path calibration. One of the serial COM ports 210 is then initialized (e.g. part of port locking).

The state machine 300 continues by sending a series of commands to the UUT 110. Specifically, a check is made for Factory Mode which is an optical module mode that permits calibration to occur. Calibration factory commands are then sent to enable calibration of the UUT 110. The Factory Data is then checked by the controller 70.

After setting up the system as described above, a transmit test is then started which may begin, as shown in FIG. 12, by enabling the TEC (thermoelectric cooler) which is a commonly used heater/cooler used to stabilize the temperature of the optical module elements such as a laser or Bragg grating. The bottom channel laser is then turned on. The transmit test continues in this fashion to test the UUT 110 transmitting functions.

It is to be understood that the portion of the particular test sequence shown in FIG. 12 is specific to the particular UUT 110 and will change depending upon the tests desired and appropriate for the type of UUT 110 and particular module that is the current UUT 110.

FIG. 13 is a start screen and shows the major areas of the GUI (graphical user interface). FIG. 13 includes four major columns one for each of the optical ports. The optical ports correspond to the optical connections made to the UUTs 110 in the common shelf 100. Although four optical ports are shown it is to be understood that this number may vary. The number four was chosen mainly due to the capability of an operator. In other words, a human operating this system may only efficiently keep up with four ports (UUTs 110) at a time.

FIG. 13 also shows a "current boards in station" area which indicates which optical modules (UUTs 110) are currently loaded into the system (in this case there are no boards loaded). Preferably, this area shows the module by serial number (SN) that uniquely identifies the UUT 110 and part number (PN) indicating the type of module (UUT 110) to be tested/calibrated. This area also includes several buttons that may be actuated by the operator. A Calibrate button calibrates the testing system and measures losses across the optical cables, connections, and switches to increase the accuracy of the UUT 110 testing; a Test Port X button serves as a trigger or start for the optical test in port X; and a Remove button indicates to the system that a UUT 110 is being removed from the common shelf.

In addition, FIG. 13 shows a Real Time Test results area which displays the results (e.g. Pass, Fail, Running) of the selected optical tests for each optical port.

Furthermore, FIG. 13 shows an On Going Test Display area which shows the ongoing test sequence and data from the test being conducted.

FIG. 13 also shows a Scan button that may be utilized to scan in a module to be tested. This Scan button actuates the bar code scanning process described above to identify the module to be tested.

FIG. 14 is another exemplary screen display showing two optical tests running in parallel. As can be seen from the different stages of progress, these two optical tests were initiated asynchronously. FIG. 14 also shows the serial number SN and module part number PN for the UUTs 110.

In column two of FIG. 14, the test sequence indicator area show the test sequence currently in progress for optical port 2.

Column one of FIG. 14 shows additional features of the invention. The mask hits, extinction ratio, crossing, and jitter are data items read by the controller 70 from the DCA 130 and displayed on display 240. The Mod Drive includes adjustment buttons (the up and down arrows) which permit an operator to adjust the laser modulator bias voltage. The crossing DAC (digital to analog converter) also includes adjustment buttons which permit the operator to adjust the digital to analog conversion taking place in a receiver module (UUT 110). These adjustment variables (Mod Drive and Crossing DAC) affect one another as well as the DCA 130 values such as the extinction ratio and crossing. Actuating the adjustment buttons causes the controller 70 to send corresponding commands to the UUT 110. By using the adjustment buttons in this fashion, an operator can fine tune the calibration of the UUT 110.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical module calibration system for calibrating a plurality of optical modules, comprising:
    a plurality of optical test signal generators each capable of outputting an optical test signal;
    a plurality of input optical switches each optically communicating with said optical test signal generators and a corresponding one of the optical modules to be calibrated;
    a plurality of optical signal measuring instruments;
    a plurality of output optical switches each optically communicating with said optical signal measuring instruments and a corresponding one of the optical modules to be calibrated; and
    a controller operatively connected to the optical modules, said optical test signal generators, said input optical switches, said output optical switches, and said optical signal measuring instruments,
    said controller controlling the optical modules, said optical test signal generators, said input optical switches, said output optical switches, and said optical signal measuring instruments to calibrate the plurality of the optical modules.

2. The optical module calibration system for calibrating a plurality of optical modules according to claim 1,
    wherein at least some of said optical signal measuring instruments are optical power meters each optically communicating with a corresponding one of said input optical switches and measuring an input optical power input to a corresponding one of the optical modules;
    said controller using input optical power measurements received from said optical power meters to send commands to the optical modules for calibrating the optical modules.

3. The optical module calibration system for calibrating a plurality of optical modules according to claim 2,
    said controller receiving data from the optical modules indicative of the respective optical module's reception of the optical test signal.

4. The optical module calibration system for calibrating a plurality of optical modules according to claim 3,
    said controller calibrating the optical modules according to the input optical power measurements received from said optical power meters and the data received from the optical modules.

5. The optical module calibration system for calibrating a plurality of optical modules according to claim 3,
    said controller diagnosing the optical modules based on the input optical power measurements received from said optical power meters and the data received from the optical modules.

6. The optical module calibration system for calibrating a plurality of optical modules according to claim 2, further comprising:
    a plurality of variable optical attenuators each optically interposed between a corresponding one of said input optical switches and a corresponding one of the optical modules;
    each of said variable optical attenuators also optically communicating with a corresponding one of said optical power meters;
    said controller also operatively connected to said variable optical attenuators; and
    said controller commanding said variable optical attenuators to adjust input optical power levels received by corresponding optical modules.

7. The optical module calibration system for calibrating a plurality of optical modules according to claim 6, further comprising:
    calibration switches each including a corresponding one of said variable optical attenuators and optically interposed between a corresponding one of said input optical switches and a corresponding one of the optical modules;
    each of said calibration switches having a signal output port optically communicating with a corresponding one of the optical modules and a calibration output port optically communicating with a corresponding one of said optical power meters; and
    said controller also operatively connected to said calibration switches.

8. The optical module calibration system for calibrating a plurality of optical modules according to claim 7,
    said controller controlling said calibration switches to alternately supply the optical test signals to a corresponding one of the corresponding optical modules and to a corresponding one of said optical power meters;
    said controller receiving input optical power measurements from said optical power meters indicative of the input optical power supplied to said optical modules;
    said controller utilizing the received input optical power measurements to control said variable optical attenuators to adjust the input optical powers of the optical test signals to a next desired power level when said calibration switches alternately supply the optical test signals to said optical power meters; and
    said controller receiving data from the optical modules indicative of the respective optical module's reception of the respective optical test signal.

9. The optical module calibrating system for calibrating a plurality of optical modules according to claim 2,
    said controller tuning each of said optical power meters and said optical test signal generators to a corresponding wavelength.

10. The optical module calibrating system for calibrating a plurality of optical modules according to claim 2, further comprising:
    an optical jumper optically connecting an input to an output of one of the optical modules;
    at least one of said optical power meters measuring an optical test signal path power loss that exists along an optical test signal path between a corresponding one of said optical test signal generators and said at least one optical power meter via said optical jumper, the optical test signal path power losses including optical power losses associated with a respective set of said input optical switches, output optical switches and optical connections;
    said controller taking the optical test signal path power loss into account when calibrating the corresponding optical module.

11. The optical module calibration system for calibrating a plurality of optical modules according to claim 1,
    wherein at least some of said optical signal measuring instruments are optical power meters each measuring an output optical power output by a corresponding one of the optical modules;

said controller using output optical power measurements received from said optical power meters to send commands to the optical modules for calibrating the optical modules.

12. The optical module calibrating system for calibrating a plurality of optical modules according to claim 11, said controller tuning each of said optical power meters and said optical test signal generators to a corresponding wavelength.

13. The optical module calibration system for calibrating a plurality of optical modules according to claim 11, said controller receiving data from the optical modules indicative of the respective optical module's output optical signal power.

14. The optical module calibration system for calibrating a plurality of optical modules according to claim 13, said controller calibrating the optical modules according to the output optical power measurements received from said optical power meters and the data received from the optical modules.

15. The optical module calibration system for calibrating a plurality of optical modules according to claim 13, said controller diagnosing the optical modules based on the output optical power measurements received from said optical power meters and the data received from the optical modules.

16. The optical module calibrating system for calibrating a plurality of optical modules according to claim 1, further comprising:

an optical signal degrader optically communicating with one of said optical test signal generators;

one of said input optical switches optically communicating with said optical signal degrader and one of the optical modules;

said controller also operatively connected to said optical signal degrader;

said controller controlling said optical signal degrader to degrade the corresponding optical test signal to a desired signal-to-noise ratio.

17. The optical module calibrating system for calibrating a plurality of optical modules according to claim 16, wherein said optical signal degrader includes a variable optical attenuator controlled by said controller.

18. The optical module calibrating system for calibrating a plurality of optical modules according to claim 17, said optical signal degrader also including an optical amplifier optically coupled to an output of said variable optical attenuator and to the one of said input optical switches.

19. The optical module calibrating system for calibrating a plurality of optical modules according to claim 1, wherein at least some of said optical signal measuring instruments are wavelength meters each measuring an output wavelength output by a corresponding one of the optical modules;

said controller using output wavelength measurements received from said wavelength meters to send commands to the optical modules for calibrating the optical modules.

20. The optical module calibrating system for calibrating a plurality of optical modules according to claim 1, said controller controlling said optical test signal generators, said input optical switches, said output switches, and said optical signal measuring equipment to perform parallel asynchronous calibration of the optical modules.

* * * * *